US012666227B2

(12) United States Patent
Hong

(10) Patent No.: US 12,666,227 B2
(45) Date of Patent: Jun. 23, 2026

(54) MBS DATA TRANSMISSION METHOD AND DEVICE THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 398 days.

(21) Appl. No.: 18/006,031

(22) PCT Filed: Jul. 22, 2021

(86) PCT No.: PCT/KR2021/009455
§ 371 (c)(1),
(2) Date: Jan. 19, 2023

(87) PCT Pub. No.: WO2022/019666
PCT Pub. Date: Jan. 27, 2022

(65) Prior Publication Data
US 2023/0292092 A1 Sep. 14, 2023

(30) Foreign Application Priority Data

Jul. 22, 2020 (KR) ........................ 10-2020-0091116
Jul. 19, 2021 (KR) ........................ 10-2021-0094216

(51) Int. Cl.
*H04W 4/06* (2009.01)
*H04W 72/20* (2023.01)
*H04W 72/30* (2023.01)

(52) U.S. Cl.
CPC ............. *H04W 4/06* (2013.01); *H04W 72/20* (2023.01); *H04W 72/30* (2023.01)

(58) Field of Classification Search
CPC ....... H04W 4/06; H04W 72/20; H04W 72/30; H04W 76/11; H04W 72/23; H04W 76/40; H04L 5/0044
See application file for complete search history.

(56) References Cited

U.S. PATENT DOCUMENTS

2009/0175213 A1 7/2009 Gu et al.
2011/0149825 A1* 6/2011 Lavi ...................... H04W 76/11
370/312

(Continued)

FOREIGN PATENT DOCUMENTS

CN 109982266 A 7/2009
CN 110035398 A 7/2019

(Continued)

OTHER PUBLICATIONS

European Patent Office, Extended European Search Report of corresponding EP Patent Application No. 21845562.4, Jul. 9, 2024.

(Continued)

*Primary Examiner* — Nicholas A Jensen
*Assistant Examiner* — Ayodele Lawrence Olubodun
(74) *Attorney, Agent, or Firm* — IP Legal Services, LLC

(57) ABSTRACT

Provided are a method and device for transmitting/receiving multicast/broadcast service (MBS) data in an NR radio access network. The method of UE for receiving MBS data may include receiving, from a base station, configuration information for receiving MBS session data; based on the configuration information, configuring a MBS radio bearer for receiving the MBS session data; and receiving a MAC protocol data unit (PDU) in which two or more mutually different logical channels associated with the same group-radio network temporary identifier (G-RNTI) are multiplexed.

14 Claims, 18 Drawing Sheets

(56) References Cited

U.S. PATENT DOCUMENTS

| | | | |
|---|---|---|---|
| 2014/0286222 A1 | 9/2014 | Yu et al. | |
| 2014/0286223 A1 | 9/2014 | Yu et al. | |
| 2014/0286224 A1 | 9/2014 | Yu et al. | |
| 2014/0286225 A1 | 9/2014 | Yu et al. | |
| 2016/0286527 A1 | 9/2016 | Yu et al. | |
| 2016/0373902 A1 | 12/2016 | Yu et al. | |
| 2018/0027578 A1 | 1/2018 | Xu et al. | |
| 2018/0049060 A1* | 2/2018 | Fujishiro | H04W 72/30 |
| 2018/0076969 A1 | 3/2018 | Yi et al. | |
| 2018/0279262 A1 | 9/2018 | Babaei et al. | |
| 2018/0359614 A1 | 12/2018 | Yu et al. | |
| 2018/0368107 A1* | 12/2018 | Babaei | H04W 76/00 |
| 2018/0368205 A1* | 12/2018 | Park | H04W 76/32 |
| 2019/0182632 A1 | 6/2019 | Fujishiro et al. | |
| 2019/0349976 A1 | 11/2019 | Rudolf | |
| 2020/0323024 A1 | 10/2020 | Huang et al. | |
| 2020/0351754 A1 | 11/2020 | Kim et al. | |
| 2021/0144516 A1 | 5/2021 | Kim et al. | |
| 2021/0392467 A1* | 12/2021 | Kim | H04W 4/06 |
| 2022/0132627 A1 | 4/2022 | Huang et al. | |
| 2023/0050170 A1* | 2/2023 | Wang | H04L 1/1854 |
| 2023/0087614 A1* | 3/2023 | Wang | H04L 12/1868 370/312 |
| 2023/0110505 A1* | 4/2023 | Wang | H04L 1/08 370/331 |
| 2023/0180349 A1* | 6/2023 | Zhu | H04W 28/0252 370/312 |
| 2023/0189300 A1 | 6/2023 | Fujishiro | |
| 2023/0254666 A1* | 8/2023 | Qi | H04W 28/0268 370/329 |
| 2024/0098844 A1 | 3/2024 | Huang et al. | |

FOREIGN PATENT DOCUMENTS

| | | |
|---|---|---|
| CN | 110546967 A | 12/2019 |
| CN | 116349290 A | 6/2023 |
| KR | 10-2019-0116810 A | 10/2019 |

OTHER PUBLICATIONS

Huawei et al., "MBS Session Management", S2-2000489, SA WG2 Meeting #136AH, Incheon, South Korea, Jan. 13-17, 2020, pp. 1-4.
Qualcomm Incorporated et al., "Solution: Integrated Multicast and Unicast Transport with Full Separation of MBS Service", S2-2001705, SA WG2 Meeting #136-AH, Incheon, South Korea, Jan. 13-17, 2020, pp. 1-4.
ZTE, "KI1, new solution Multicast MBS Session establishment linked with unicast PDU session", S2-2004493, SA WG2 Meeting #S2-139E, Jun. 1-12, 2020, Electronic, Elbonia, pp. 1-5.
3GPP, "3rd Generation Partnership Project; Technical Specification Group Services and System Aspects; Study on architectural enhancements for 5G multicast-broadcast services (Release 17)", 3GPP TR 23.757 V0.3.0 (Jan. 2020), pp. 1-37.
The State Intellectual Property Office of People's Republic of China, Office Action of corresponding CN Patent Application No. 202180059545.8, Apr. 25, 2024.
SA4 MBS SWG Chairman, "3GPP SA4 MBS SWG report at SA4#109-e", Tdoc S4-200881, TSG SA4#109-e meeting, May 20-Jun. 3, 2020, Electronic meeting, pp. 1-97.

* cited by examiner

One subframe

Resource grid, 2deltaf

Resource grid, deltaf

Carrier bandwidth

One resource block-12 subcarriers,
subcarrier spacing 2deltaf

One resource block-12 subcarriers,
subcarrier spacing 2deltaf

SYNC : Protocol to synchronise
data used to generate a certain
radio frame

FIG.14

| Codepoint/Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

*FIG.15*
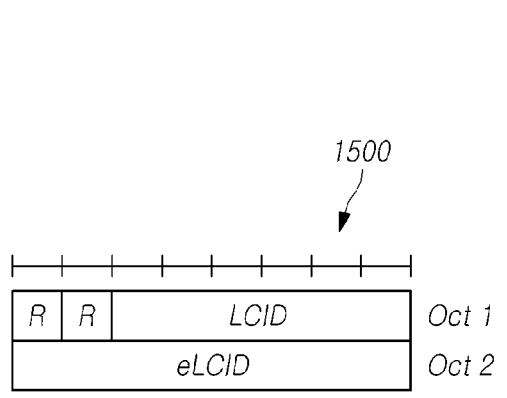
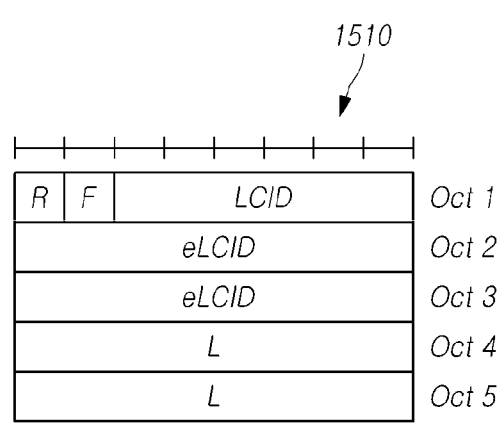

Values of two-octet eLCID for DL-SCH

| Codepoint | Index | LCID values |
|---|---|---|
| 0 to $(2^{16} - 1)$ | 320 to $(2^{16} + 319)$ | Identity of the logical channel |

1610

Values of one-octet eLCID for DL-SCH

| Codepoint | Index | LCID values |
|---|---|---|
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

MBS DATA TRANSMISSION METHOD AND DEVICE THEREFOR

CROSS REFERENCE TO RELATED APPLICATIONS

This application is a National Stage Patent Application of PCT International Patent Application No. PCT/KR2021/009455 (filed on Jul. 22, 2021) under 35 U.S.C. § 371, which claims priority to Korean Patent Application Nos. 10-2020-0091116 (filed on Jul. 22, 2020) and 10-2021-0094216 (filed on Jul. 19, 2021), the teachings of which are incorporated herein in their entireties by reference.

TECHNICAL FIELD

The disclosure relates to a method and device for transmitting/receiving multicast/broadcast service data in an NR radio access network.

BACKGROUND ART

Cellular mobile communication networks have been mainly developed to provide end-to-end/point-to-point transmission services, but the development of broadband wireless transmission technologies and terminals that provide various functions are leading to demand for various services. In particular, multimedia broadcast multicast service (MBMS) is a technology that may provide mobile broadcasting services using a cellular mobile communication network. Recently, various techniques are being developed to provide disaster relief communication services using enhanced MBMS (hereinafter, "eMBMS").

Unlike the end-to-end transmission service, MBMS is an end-to-many/point-to-multipoint transmission service and may advantageously increase the efficiency of use of radio resources by transmitting the same packet to multiple terminals within a single cell. Further, the MBMS service adopts a multi-cell transmission scheme that enables a plurality of base stations to simultaneously transmit the same packet, and such multi-cell transmission scheme allows the terminal receiving the service to obtain a diversity gain in the physical layer.

However, when the base station transmits MBMS service data, the efficiency may vary depending on the number of UEs that receive the corresponding data. Therefore, it is required to develop a technique for controlling the MBS session based on NR and providing service continuity.

Further, it is also required to develop a technique for efficiently providing MBS data to a UE according to a QoS flow.

DETAILED DESCRIPTION OF THE INVENTION

Technical Problem

The disclosure provides technology for a UE to receive MBS data.

Technical Solution

In an aspect, a method may be provided for receiving multicast/broadcast service (MBS) data by a UE. The method may include receiving configuration information for receiving MBS session data from a base station, configuring an MBS radio bearer for receiving the MBS session data based on the configuration information, and receiving a MAC protocol data unit (PDU) in which two or more different logical channels associated with the same group-radio network temporary identifier (G-RNTI) are multiplexed.

In another aspect, a method may be provided for transmitting multicast/broadcast service (MBS) data by a base station. The method may include transmitting configuration information for receiving MBS session data by a UE to the UE, configuring an MBS radio bearer for transmitting the MBS session data based on the configuration information, and transmitting a MAC protocol data unit (PDU) in which two or more different logical channels associated with the same group-radio network temporary identifier (G-RNTI) are multiplexed.

In another aspect, a user equipment (UE) may be provided for receiving multicast/broadcast service (MBS) data. The UE may include a receiver receiving configuration information for receiving MBS session data from a base station and a controller configuring an MBS radio bearer for receiving the MBS session data based on the configuration information, wherein the receiver receives a MAC protocol data unit (PDU) in which two or more different logical channels associated with the same group-radio network temporary identifier (G-RNTI) are multiplexed.

In another aspect, a base station may be provided for transmitting multicast/broadcast service (MBS) data. The base station may include a transmitter transmitting configuration information for receiving MBS session data by a UE to the UE and a controller configuring an MBS radio bearer for transmitting the MBS session data based on the configuration information, wherein the transmitter transmits a MAC protocol data unit (PDU) in which two or more different logical channels associated with the same group-radio network temporary identifier (G-RNTI) are multiplexed.

Advantageous Effects

According to embodiments of the present disclosure, the UE effectively receives and processes MBS data.

US 12,666,227 B2

3

Figure 13:
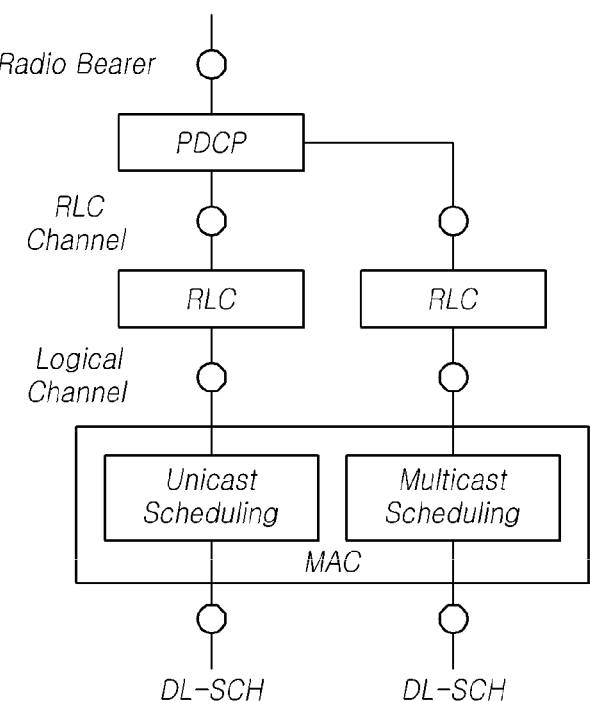

FIG. 13 is a view illustrating another example of a layer 2 structure for transmitting/receiving MBS data.

FIG. 14 is a view illustrating a logical channel identifier value according to an embodiment.

FIG. 15 is a view exemplarily illustrating a MAC sub-header format including an extended LCID field according to an embodiment.

FIG. 16 is a view illustrating allocation information according to each octet length of an extended LCID value for a DL-SCH according to an embodiment.

Figure 17:
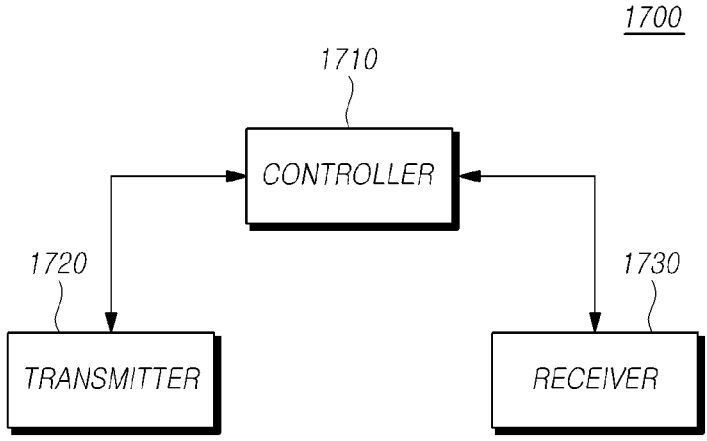

FIG. 17 is a block diagram illustrating a UE according to an embodiment.

Figure 18:
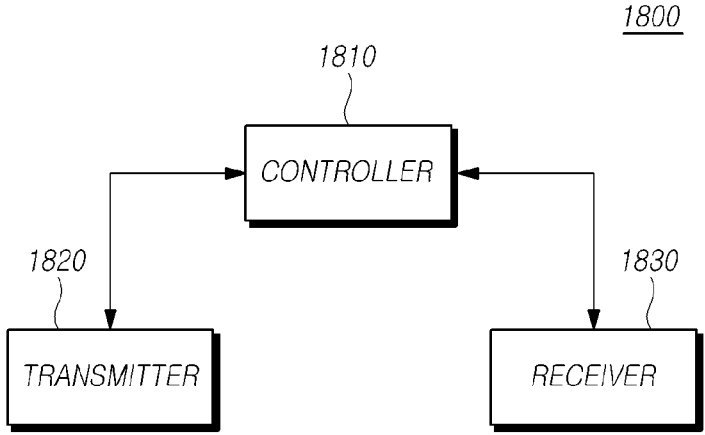

FIG. 18 is a block diagram illustrating a base station according to an embodiment.

MODE FOR CARRYING OUT THE INVENTION

Hereinafter, embodiments of the disclosure are described in detail with reference to the accompanying drawings. The same or substantially the same reference denotations are used to refer to the same or substantially the same elements throughout the specification and the drawings. When determined to make the subject matter of the present invention unclear, the detailed of the known art or functions may be omitted. The terms "comprises" and/or "comprising," "has" and/or "having," or "includes" and/or "including" when used in this specification specify the presence of stated features, regions, integers, steps, operations, elements, and/or components, but do not preclude the presence or addition of one or more other features, regions, integers, steps, operations, elements, components, and/or groups thereof. As used herein, the singular forms "a", "an" and "the" are intended to include the plural forms as well, unless the context clearly indicates otherwise.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

In describing the positional relationship between components, when two or more components are described as "connected", "coupled" or "linked", the two or more components may be directly "connected", "coupled" or "linked"", or another component may intervene. Here, the other component may be included in one or more of the two or more components that are "connected", "coupled" or "linked" to each other.

In relation to components, operational methods or manufacturing methods, when A is referred to as being "after," "subsequent to," "next," and "before," A and B may be discontinuous from each other unless mentioned with the term "immediately" or "directly."

When a component is designated with a value or its corresponding information (e.g., level), the value or the corresponding information may be interpreted as including a tolerance that may arise due to various factors (e.g., process factors, internal or external impacts, or noise).

In the disclosure, 'wireless communication system' means a system for providing various communication services, such as a voice service and a data packet service, using a radio resource. The wireless communication system may include a user equipment (UE), a base station, or a core network.

The present embodiments disclosed below may be applied to wireless communication systems using various radio access technologies. For example, the present embodiments may be applied to various radio access technologies, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). Further, radio access technology may mean not only a specific access technology, but also a communication technology for each generation established by various communication organizations, such as $3^{rd}$ generation partnership project (3GPP), 3GPP2, Wi-Fi, Bluetooth, Institute of electrical and electronic engineers (IEEE), and international telecommunication union (ITU). For example, CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented with a wireless technology, such as institute of electrical and electronic engineers (IEEE) 802.11 (Wi-Fi), IEEE 802.16 (WiMAX), IEEE 802-20, evolved UTRA (E-UTRA), and the like. IEEE 802.16m is an evolution of IEEE 802.16e and provides backward compatibility with IEEE 802.16e-based systems. UTRA is part of UMTS (universal mobile telecommunications system). 3GPP (3rd generation partnership project) LTE (long term evolution) is part of E-UMTS (evolved UMTS) using evolved-UMTS terrestrial radio access (E-UTRA) and adopts OFDMA for downlink and SC-FDMA for uplink. As such, the present embodiments may be applied to currently disclosed or commercialized radio access technologies and may also be applied to radio access technologies currently under development or to be developed in the future.

Meanwhile, in the disclosure, 'UE' is a comprehensive concept meaning a device including a wireless communication module that communicates with a base station in a wireless communication system and should be interpreted as a concept that may include not only user equipment (UE) in, e.g., WCDMA, LTE, NR, HSPA, and IMT-2020 (5G or new radio), but also a mobile station (MS), user terminal (UT), subscriber station (SS), or wireless device in GSM. Further, the UE may be a user portable device, such as a smartphone, according to the usage type and, in the V2X communication system, the UE may mean a vehicle or a device including a wireless communication module in the vehicle. Further, in the case of a machine type communication (MTC) system, the UE may mean an MTC terminal, machine to machine (M2M) terminal, or URLLC terminal equipped with a communication module to perform machine type communication.

In the disclosure, 'base station' or 'cell' refers to a terminal that communicates with a UE in terms of a network and in concept encompasses various coverage areas, such as node-B, evolved node-B (eNB), gNode-B (gNB), low power node (LPN), sector, site, various types of antennas, base transceiver system (BTS), access point, point (e.g. transmission point, reception point, or transmission/reception point), relay node, mega cell, macro cell, micro cell, pico cell, femto cell, remote radio head (RRH), radio unit (RU), or small cell. Further, 'cell' may mean one including a bandwidth part (BWP) in the frequency domain. For example, 'serving cell' may mean the activation BWP of the UE.

Since there is a base station controlling one or more cells in the various cells enumerated above, the base station may be interpreted in two meanings. The base station may be 1) a device itself which provides a mega cell, a macro cell, a micro cell, a pico cell, a femto cell, or a small cell in relation to the radio region, or 2) the radio region itself. In 1), the base station may be devices controlled by the same entity or all devices interacting with each other and cooperatively configuring a radio region. An embodiment of the base station is a transmission/reception point, transmission point, or reception point depending on the scheme of configuring the radio region. In 2), the base station may be the radio region itself, in which a user equipment (UE) may be enabled to transmit a signal to and receive a signal from another UE or a neighboring base station.

In the disclosure, 'cell' may mean the coverage of the signal transmitted from the transmission/reception point, a component carrier having the coverage of the signal transmitted from the transmission/reception point (transmission point or transmission/reception point), or the transmission/reception point itself.

Uplink (UL) means a scheme for transmitting/receiving data from a UE to a base station, and downlink (DL) means a scheme for transmitting/receiving data from a base station to a UE. Downlink may mean communication or communication path from the multiple transmission/transmission points to the UE, and uplink may mean communication or communication path from the UE to the multiple transmission/reception points. In this case, in the downlink, the transmitter may be part of the multiple transmission/reception points, and the receiver may be part of the UE. Further, in the uplink, the transmitter may be part of the UE, and the receiver may be part of the multiple transmission/reception points.

Uplink and downlink transmits/receives control information through a control channel, such as physical downlink control channel (PDCCH) or physical uplink control channel (PUCCH) and configures a data channel, such as physical downlink shared channel (PDSCH) or physical uplink shared channel (PUSCH) to transmit/receive data. Hereinafter, data (e.g., signal) transmission or reception through a channel, such as PUCCH, PUSCH, PDCCH, and PDSCH, is expressed as 'transmitting or receiving PUCCH, PUSCH, PDCCH, and PDSCH.'

Although the technical spirit is described focusing primarily on the 3GPP LTE/LTE-A/new RAT (NR) communication system for clarity of description, the technical features are not limited to such communication system.

3GPP develops 5th-generation (5G) communication technology to meet the requirements of ITU-R's next-generation radio access technology after research on 4th-generation (4G) communication technology. Specifically, 3GPP develops new radio (NR) as new communication technology separate from LTE-A pro and 4G communication technology, which have enhanced LTE-advanced technology to meet the requirements of ITU-R, as 5G communication technology. Both LTE-A pro and NR refer to 5G communication technologies. Hereinafter, 5G communication technology is described focusing on NR unless specified as a specific communication technology.

In NR, various operating scenarios have been defined in considerations of satellites, automobiles, and new verticals in the typical 4G LTE scenarios. The operating scenarios may include an enhanced mobile broadband (eMBB) scenario, a massive machine communication (mMTC) scenario that has high UE density but is deployed in a wide range to requires a low data rate and asynchronous access, and a ultra-reliability and low latency (URLLC) scenario that requires high responsiveness and reliability and may support high-speed mobility.

To satisfy requirements of scenarios, NR introduces wireless communication systems that adopt a new waveform and frame structure technology, low-latency technology, ultra-high frequency band (mmWave) supporting technology, and forward compatibility providing technology. In particular, the NR system suggests various technical changes in terms of flexibility to provide forward compatibility. The main technical features of NR are described below with reference to the drawings.

<Overview of NR System>

Figure 1:
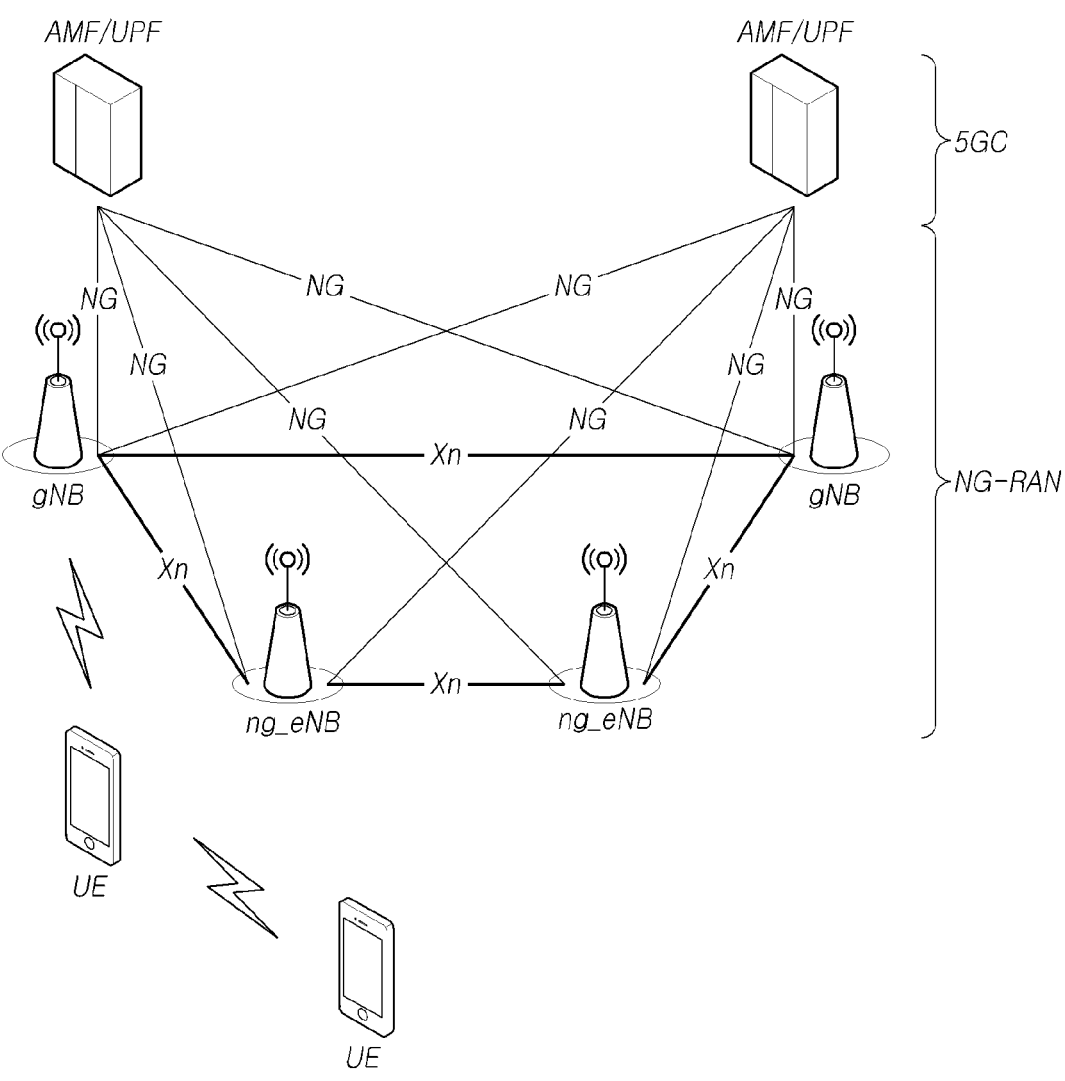
FIG. 1 illustrates a structure for an NR wireless communication system.

FIG. 1 is a view illustrating a structure for an NR system.

Referring to FIG. 1, the NR system is divided into a 5G core network (5GC) and an NR-RAN part. The NG-RAN includes gNBs and ng-eNBs providing user plane (SDAP/PDCP/RLC/MAC/PHY) and user equipment (UE) control plane (RRC) protocol termination. The gNBs or the gNB and the ng-eNB are connected to each other through Xn interfaces. The gNB and the ng-eNB are connected to the 5GC through NG interfaces, respectively. The 5GC may be configured to include an access and mobility management function (AMF) for managing the control plane, such as UE access and mobility control function, and a user plane function (UPF) for controlling the user data control function. NR supports both frequency bands below 6 GHz (Frequency Range 1 (FR1) and frequency bands equal to or greater than 6 GHz (Frequency Range 2 (FR2)).

The gNB denotes a base station that provides a UE with NR user plane and control plane protocol termination, and the ng-eNB is a base station that provides a UE with the E-UTRA user plane and control plane protocol termination. In the disclosure, the base station should be understood as encompassing gNB and ng-eNB and, as necessary, be used to separately denote gNB or ng-eNB.

<NR Waveform, Numerology, and Frame Structure>

NR uses a CP-OFDM waveform using a cyclic prefix for downlink transmission and a CP-OFDM or a DFT-s-OFDM for uplink transmission. OFDM technology is easily combined with multiple input multiple output (MIMO) and has the advantages of high frequency efficiency and capability of using a low-complexity receiver.

Meanwhile, since, in NR, the above-described three scenarios have different requirements for data rate, latency, and coverage, it is needed to efficiently meet the requirements for each scenario through the frequency band constituting a NR system. To that end, there has been proposed technology for efficiently multiplexing radio resources based on a plurality of different numerologies.

Specifically, the NR transmission numerology is determined based on subcarrier spacing and a cyclic prefix (CP). As shown in Table 1 below, "µ" is exponentially changed, with the exponent value of 2 with respect to 15 kHz.

TABLE 1

| µ | subcarrier spacing | Cyclic prefix | Supported for data | Supported for synch |
|---|---|---|---|---|
| 0 | 15 | normal | Yes | Yes |
| 1 | 30 | normal | Yes | Yes |
| 2 | 60 | Normal, Extended | Yes | No |
| 3 | 120 | normal | Yes | Yes |
| 4 | 240 | normal | No | Yes |

Figure 2:
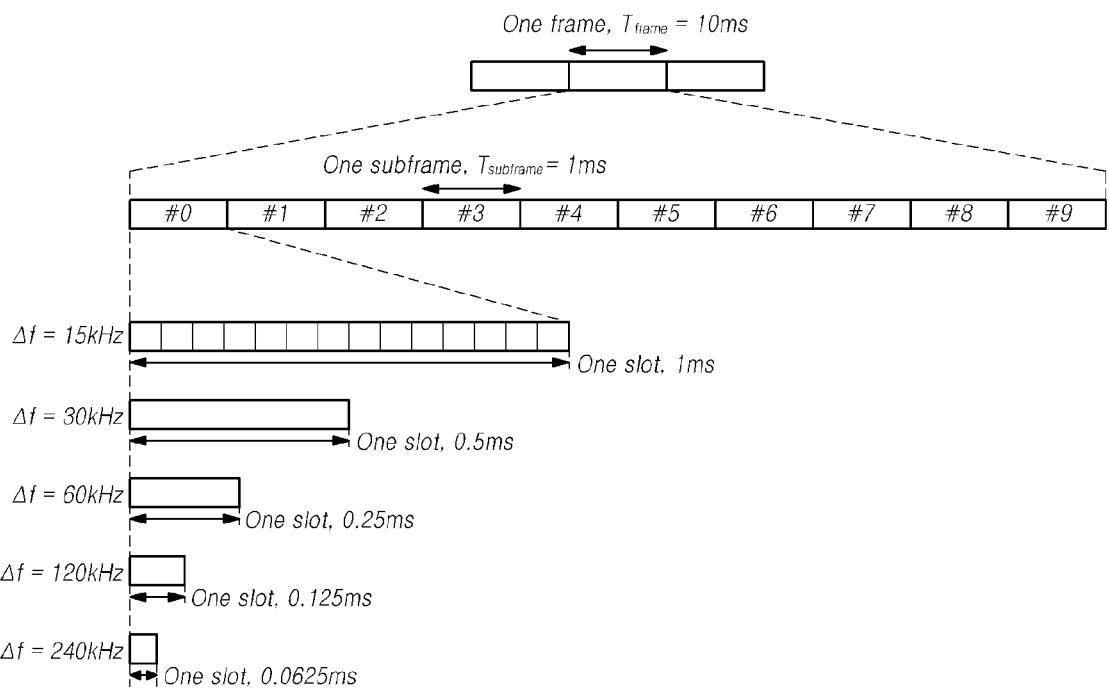
FIG. 2 is a view illustrating a frame structure in an NR system.

As shown in Table 1 above, the NR numerologies may be divided into five types depending on the subcarrier spacing. The NR numerologies differ from LTE (e.g., 4G communication technology) which uses the subcarrier spacing fixed to 15 kHz. Specifically, in NR, the subcarrier spacings used for data transmission are 15, 30, 60, and 120 kHz, and the subcarrier spacings used for synchronization signal transmission are 15, 30, 120, and 240 kHz. Further, an extended CP is applied only to the 60 kHz subcarrier spacing. In NR, a frame is defined to include 10 subframes each having the same length of 1 ms and to have a length of 10 ms. One frame may be divided into half frames of 5 ms, and each half frame may include 5 subframes. In the case of the 15 kHz subcarrier spacing, one subframe is constituted of one slot, and each slot is constituted of 14 OFDM symbols. FIG. 2 is a view illustrating a frame structure in an NR system.

Referring to FIG. 2, a slot is fixedly composed of 14 OFDM symbols in the case of a normal CP, but the length of the slot in a time domain may vary depending on subcarrier spacing. For example, in the case of a numerology having a 15 kHz subcarrier spacing, a slot has a length of 1 ms which is the same length as the subframe. In contrast, in the case of a numerology having a 30 kHz subcarrier spacing, a slot is constituted of 14 OFDM symbols, but two slots may be included in one subframe. Accordingly, one slot has the length of 0.5 ms. In other words, the subframe and the frame are defined to have a fixed length, and the slot is defined as the number of symbols. Accordingly, the temporal length (e.g., the length of the slot) may vary depending on the subcarrier spacing.

Meanwhile, NR defines a slot as a basic unit for scheduling and, an adopted minislot (or subslot or non-slot based schedule) to reduce transmission latency in the radio section. If a wide subcarrier spacing is used, the length of one slot is inverse-proportionally shortened, so that it is possible to reduce transmission latency in the radio section. The minislot is for efficient support of the URLLC scenario and enables scheduling in the units of 2, 4, or 7 symbols.

Further, NR defines uplink and downlink resource allocation as a symbol level in one slot, unlike LTE. To reduce HARQ latency, a slot structure has been defined to enable HARQ ACK/NACK to be transmitted directly in the transmission slot, and such slot structure is referred to as a self-contained structure in the description.

NR is designed to support a total of 256 slots. Among them, 62 slot formats are used in 3GPP Rel-15. Further, NR supports a common frame structure that constitutes a FDD frame or a TDD frame through a combination of various slots. For example, all symbols of a slot may be configured as downlink, all symbols may be configured as uplink, and a slot may be combined with downlink symbols and uplink symbols. Further, NR supports distributed and scheduled data transmission in one or more slots. Therefore, the base station may inform the UE of whether a slot is a downlink slot, uplink slot, or flexible slot using a slot format indicator (SFI). The base station may inform a slot format using the SFI by indicating an index of a table configured through UE-specific RRC signaling. Further, the base station may dynamically indicate the slot format through downlink control information (DCI) or may statically or semi-statically indicate the same through RRC.

<NR Physical Resource>

In NR, an antenna port, a resource grid, a resource element, a resource block, and a bandwidth part may be considered as a physical resource.

The antenna port is defined to infer a channel carrying a symbol on an antenna port from another channel carrying another symbol on the same antenna port. For example, in case of inferring large-scale property of a channel carrying a symbol on one antenna port from another channel carrying another symbol on a different antenna port, the two antenna ports may be considered as having a QC/QCL (quasi co-located or quasi co-location) relationship. Here, the large-scale properties include one or more of delay spread, Doppler spread, frequency shift, average received power, and received timing.

Figure 3:
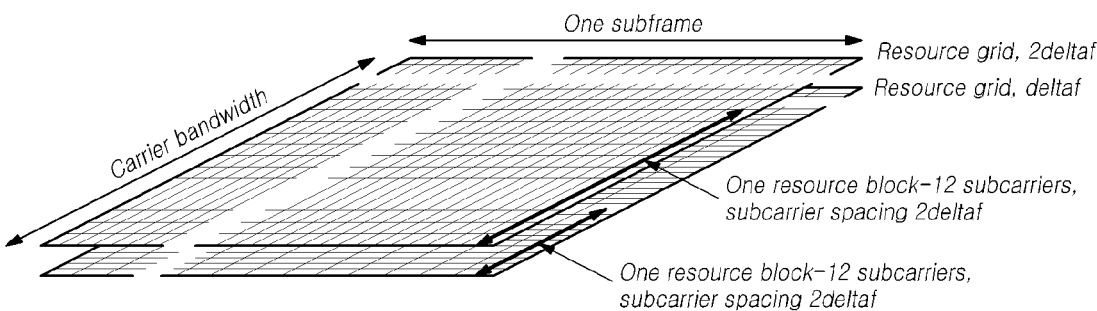
FIG. 3 is a view illustrating a resource grid supported by radio access technology.

FIG. 3 is a view illustrating a resource grid supported by radio access technology.

Referring to FIG. 3, since NR supports a plurality of numerologies in the same carrier, a resource grid may exist per each numerology. Further, the resource grid may exist per the antenna port, subcarrier spacing, or transmission direction.

A resource block is constituted of 12 subcarriers and is defined only in the frequency domain. Further, the resource element is constituted of one OFDM symbol and one subcarrier. Therefore, as shown in FIG. 3, the size of one resource block may vary depending on the subcarrier spacing. Further, in NR, "point A", which serves as a common reference point for the resource block grid, a common resource block, and a virtual resource block are defined.

Figure 4:
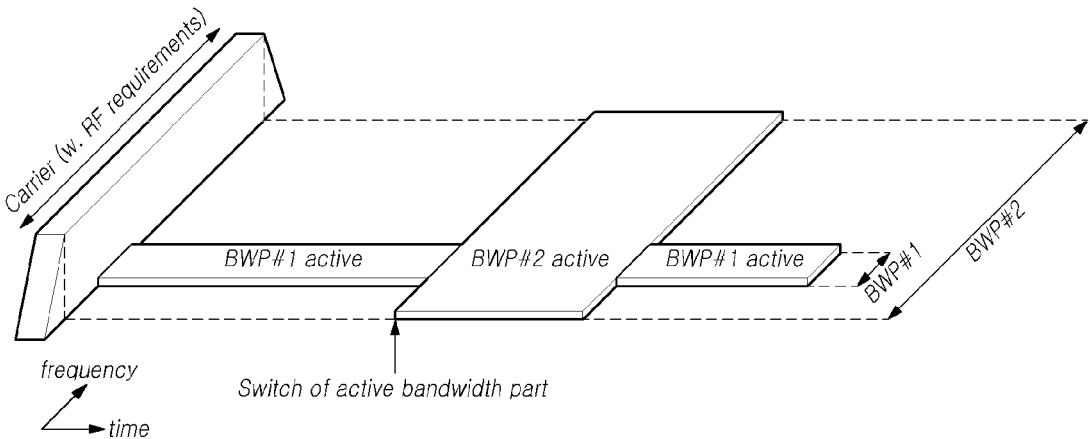
FIG. 4 is a view illustrating a bandwidth part supported by radio access technology.

FIG. 4 is a view illustrating a bandwidth part supported by radio access technology.

In NR, unlike LTE where the carrier bandwidth is fixed to 20 Mhz, the maximum carrier bandwidth is set from 50 Mhz to 400 Mhz for each subcarrier spacing. Therefore, it is not assumed that all UEs use all of these carrier bandwidths. Accordingly, in NR, as shown in FIG. 4, a bandwidth part (BWP) may be designated within the carrier bandwidth and used by the UE. Further, the bandwidth part is associated with one numerology and is composed of a subset of contiguous common resource blocks. The bandwidth part may be activated dynamically over time. In a UE, up to four bandwidth parts may be configured for each of uplink and downlink. Data is transmitted/received using the bandwidth part activated at a given time.

In the case of paired spectra, the uplink and downlink bandwidth parts are set independently. In the case of unpaired spectra, the bandwidth parts of uplink and downlink are set to make a pair to share the center frequency to prevent unnecessary frequency re-tuning between downlink and uplink operations.

<NR Initial Access>

In NR, a UE performs a cell search procedure and a random access procedure to access a base station and perform communication.

In the cell search procedure, a UE is synchronized with a cell of a base station using a synchronization signal block (SSB) transmitted from the base station, obtains a physical layer cell ID, and obtains system information.

Figure 5:
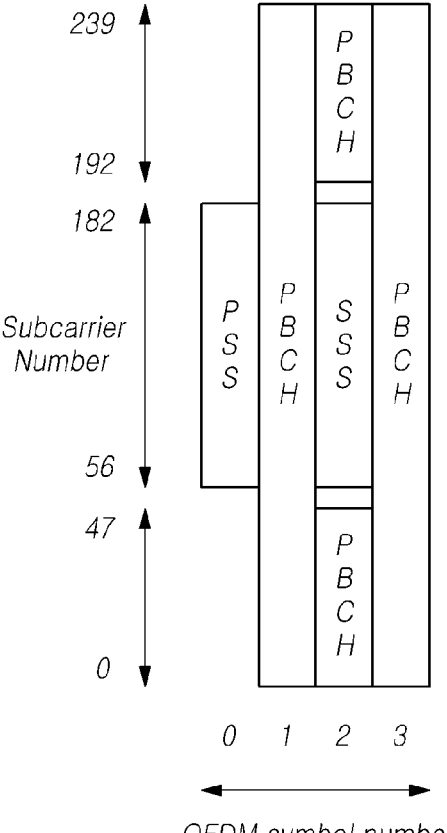
FIG. 5 is a view exemplarily illustrating a synchronization signal block in radio access technology.

FIG. 5 is a view exemplarily illustrating a synchronization signal block in radio access technology.

Referring to FIG. 5, a SSB is constituted of a primary synchronization signal (PSS) and a secondary synchronization signal (SSS) occupying one symbol and 127 subcarriers, respectively, and a PBCH spanning three OFDM symbols and 240 subcarriers.

The UE monitors the SSB in time and frequency domains and receives the SSB.

The SSB may be transmitted up to 64 times in 5 ms. Multiple SSBs are transmitted on different transmission beams within 5 ms, and the UE performs detection assuming that SSBs are transmitted every 20 ms period based on one specific beam used for transmission. The number of beams available for SSB transmission within 5 ms may increase as the frequency band increases. For example, up to 4 SSB beams may be transmitted below 3 GHz, SSBs may be transmitted using up to 8 different beams in a frequency band of 3 to 6 GHz, and up to 64 different beams in a frequency band of 6 GHz or higher.

One slot includes two SSBs. A start symbol and the number of repetitions within the slot are determined according to the subcarrier spacing as follows.

Meanwhile, the SSB is not transmitted at a center frequency of a carrier bandwidth unlike the SS of typical LTE. In other words, the SSB may be transmitted even in a place other than the center of the system band. In the case of supporting wideband operation, a plurality of SSBs may be transmitted in a frequency domain. Accordingly, the UE monitors the SSB by a synchronization raster, which is a candidate frequency location for monitoring the SSB. In NR, the carrier raster and synchronization raster are newly defined, and they are the center frequency location information about the channel for initial access. The synchronization raster has a wider frequency interval than the carrier raster in order to enable the UE for fast SSB search.

The UE may obtain a master information block (MIB) through a PBCH of a SSB. The master information block (MIB) includes minimum information for the UE to receive remaining system information (e.g., remaining minimum system information (RMSI)) broadcast by the network. Further, the PBCH may include information about the position of the first DM-RS symbol in the time domain, information for monitoring SIB1 by the UE (e.g., SIB1 numerology information, information related to SIB1 CORESET, search space information, PDCCH-related parameter information, etc.), offset information between the common resource block and the SSB (the absolute location of the SSB within the carrier is transmitted through SIB1), and the like. Here, the SIB1 numerology information is equally applied to messages used in the random access procedure for the UE to access the base station after completing the cell search procedure. For example, the numerology information about SIB1 may be applied to at least one of messages 1 to 4 for the random access procedure.

The above-described RMSI may be system information block 1 (SIB1). SIB1 is broadcast periodically (e.g., 160 ms) in the cell. SIB1 includes information necessary for the UE to perform an initial random access procedure and is periodically transmitted through the PDSCH. To receive SIB1, the UE needs to receive numerology information used for SIB1 transmission and control resource set (CORESET) information used for SIB1 scheduling through the PBCH. The UE identifies scheduling information for SIB1 using SI-RNTI in CORESET and obtains SIB1 on PDSCH according to scheduling information. The remaining SIBs except for SIB1 may be transmitted periodically and may be transmitted at the request of the UE.

Figure 6:
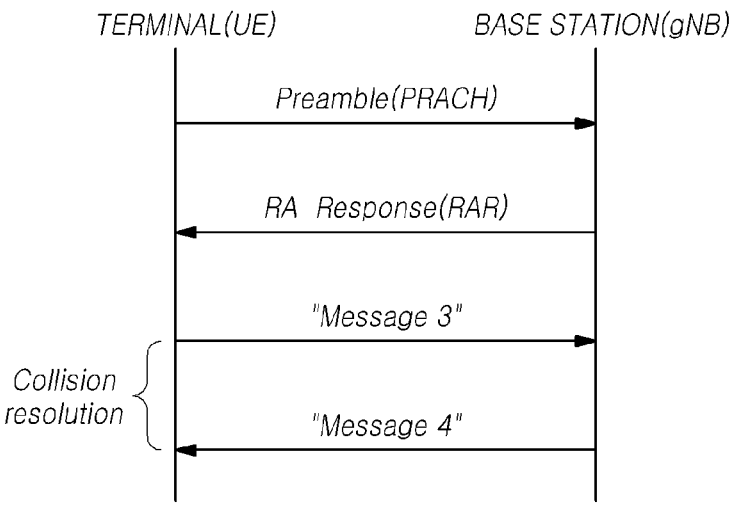
FIG. 6 is a view illustrating a random access procedure in radio access technology.

FIG. 6 is a view illustrating a random-access procedure in radio access technology.

Referring to FIG. 6, when cell search is completed, a UE transmits a random access preamble for random access to a base station. The random access preamble is transmitted through PRACH. Specifically, the random access preamble is transmitted to the base station through the PRACH composed of contiguous radio resources in a periodically repeated specific slot. In general, when the UE initially accesses a cell, a contention-based random access procedure is performed, and when random access is performed for beam failure recovery (BFR), a non-contention-based random access procedure is performed.

The UE receives a random access response in response to the transmitted random access preamble. The random access response may include a random access preamble identifier (ID), uplink radio resource (UL grant), temporary cell-radio network temporary identifier (C-RNTI), and time alignment command (TAC). Since one random access response may include random access response information for one or more UEs, the random access preamble identifier may be included in order to indicate the UE for which the included UL grant, temporary C-RNTI, and TAC are valid. The random access preamble identifier may be an identifier for the random access preamble received by the base station. The TAC may be included as information for the UE to adjust uplink synchronization. The random access response may be indicated by a random access identifier on the PDCCH, e.g., a random access-radio network temporary identifier (RA-RNTI).

Upon receiving a valid random access response, the UE processes information included in the random access response and performs scheduled transmissions to the base station. For example, the UE applies the TAC and stores the temporary C-RNTI. Further, the UE transmits data stored in the buffer of the UE or newly generated data to the base station using the UL grant. In this case, information for identifying the UE should be included in the data.

Finally, the UE receives a downlink message for contention resolution.

<NR CORESET>

In NR, a downlink control channel is transmitted in a control resource set (CORESET) having a length of 1 to 3 symbols and transmits uplink/downlink scheduling information, slot format index (SFI), transmit power control (TPC) information, etc.

As such, NR introduced the concept of CORESET in order to secure the flexibility of the system. The control resource set (CORESET) refers to a time-frequency resource for a downlink control signal. The UE may use one or more search spaces in CORESET time-frequency resources to decode control channel candidates. A quasi co-location (QCL) assumption is configured and is used for the purpose of providing information on the characteristics of the analog beam directions, as well as the latency spread, Doppler spread, Doppler shift, and average latency, which are characteristics assumed by the typical QCL.

Figure 7:
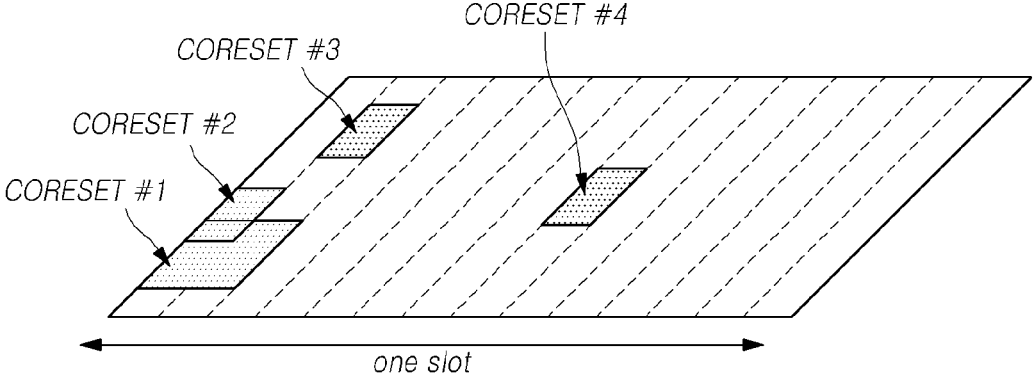
FIG. 7 is a view illustrating a CORESET.

FIG. 7 is a view illustrating a CORESET.

Referring to FIG. 7, the CORESET may exist in various forms within a carrier bandwidth within one slot. In the time domain, the CORESET may be constituted of up to 3 OFDM symbols. Further, the CORESET is defined as a multiple of 6 resource blocks up to the carrier bandwidth in the frequency domain.

A first CORESET, as a part of the initial bandwidth part, is designated (e.g., instructed, assigned) through an MIB in order to receive additional configuration information and system information from a network. After establishing a connection with the base station, the UE may receive and configure one or more CORESET information through RRC signaling.

In this specification, a frequency, a frame, a subframe, a resource, a resource block, a region, a band, a subband, a control channel, a data channel, a synchronization signal, various reference signals, various signals, and various messages related to new radio (NR) may be interpreted as meanings used a present or in the past or an various meanings to be used in the future.

NR (New Radio)

As described above, NR is designed not only to provide an improved data transmission rate but also to satisfy various QoS requirements required for each of specified usage scenarios. In particular, the representative usage scenarios of NR may include enhancement mobile broadband (eMBB), massive MTC (mMTC), and ultra-reliable and low latency communications (URLLC). As a method for meeting the requirements for each usage scenario, a frame structure is designed to be flexible as compared with LTE, such as a flexible frame structure. Each usage scenario has different requirements for data rates, latency, reliability, coverage, etc. Therefore, as a method to efficiently satisfy the requirements for each usage scenario through the frequency band of a NR system, a radio resource unit is designed to be efficiently multiplexed based on different numerologies (e.g., subcarrier spacing, subframe, TTI, etc.).

For example, there has been discussions on i) a method for multiplexing numerologies having subcarrier spacing (SCS) values different from one another based on TDM, FDM, or TDM/FDM through over cone NR carriers, and ii) methods of supporting one or more time units in configuring a scheduling unit in the time domain. In this regard, NR defines a subframe as one type of time domain structure. As reference numerology for defining the subframe duration, it is determined to define a single subframe duration composed of 14 OFDM symbols of normal CP overhead based on 15 kHz sub-carrier spacing (SCS) which is the same as that of LTE. Accordingly, in NR, the subframe has 1 ms time duration. However, unlike LTE, the subframe of NR is absolute reference time duration and, as a time unit which serves as a basis of actual uplink/downlink data scheduling, a slot and a mini-slot may be defined. In this case, the number (y value) of OFDM symbols constituting a corresponding slot is determined to be y=14 regardless of the SCS value in the case of normal CP.

Therefore, a slot is constituted of 14 symbols. Further, depending on the transmission direction of the corresponding slot, all the symbols may be used for DL transmission, or all the symbols may be used for UL transmission, or the symbols may be used in the form of DL portion+(gap)+UL portion.

Further, in any numerology (or SCS), a mini-slot is defined to be constituted of a smaller number of symbols than the slot. For minislot-based uplink/downlink data transmission/reception, a short-length time-domain scheduling interval may be set, or a long-length time-domain scheduling interval for uplink/downlink data transmission/reception may be configured via slot aggregation. In particular, in the case where latency-sensitive data, such as URLLC, is transmitted or received, if scheduling is performed in slot units which are based on 1 ms (14 symbols) as defined in the numerology-based frame structure which has a small SCS value, e.g., 15 kHz, it is difficult to satisfy the latency requirements. Thus, a mini-slot constituted of a smaller number of OFDM symbols than the slot constituted of 14 symbols may be defined and, based thereupon, scheduling capable of meeting the URLLC requirements may be carried out.

Meanwhile, in NR, the default scheduling unit has been changed to a slot. Further, regardless of subcarrier-spacing, the slot consists of 14 OFDM symbols. In contrast, NR supports a non-slot structure configured of 2, 4, or 7 OFDM symbols, which is a smaller scheduling unit. The non-slot structure may be utilized as a scheduling unit for URLLC service.

MBMS (Multimedia Broadcast Multicast Service) in LTE Network

3GPP has developed LTE broadcast/multicast standards for video broadcasting from Rel-9. Since then, standards have been specified to support other services, such as public safety, IoT, and V2X, in LTE. For NR, the Rel-15 and Rel-16 standards do not support MBMS. It is determined that MBMS-related standards should be further developed in the NR standard of the later release.

Meanwhile, in the LTE-based typical MBMS, two transmission schemes are provided: multimedia broadcast multicast service single frequency network (MBSFN) transmission; and single cell point to multipoint (SC-PTM) transmission.

The MBSFN transmission scheme is appropriate for providing media broadcasting in a large-scale pre-planned area (MBSFN area). The MBSFN area is statically configured. For example, this is configured by O&M. It may not be dynamically adjusted according to a user distribution. Synchronized MBMS transmission is provided within the MBSFN area, and combining is supported for MBMS transmission from a plurality of cells. Each MCH scheduling is performed by a multi-cell/multicast coordination Entity (MCE), and a single transport block is used for each TTI for MCH transmission. Further, the transport block uses the MBSFN resource in the subframe. MTCH and MCCH may be multiplexed on the same MCH. MTCH and MCCH use the RLC-UM mode. Even if all radio resources are not used in the frequency domain, unicast and multiplexing are not allowed in the same subframe. As such, the MBSFN transmission scheme is hard to dynamically adjust and apply to small-scale broadcast services.

The SC-PTM transmission scheme was developed to enhance the inefficiency of the MBSFN transmission scheme. MBMS is transmitted within single cell coverage through SC-PTM. One SC-MCCH and one or more SC-MTCHs are mapped to the DL-SCH. Scheduling is provided by the base station. SC-MCCH and SC-MTCH each are indicated by one logical channel-specific RNTI (SC-RNTI or G-RNTI) on the PDCCH. SC-MTCH and SC-MCCH use the RLC-UM mode. Although single transmission is used for DL-SCH to which SC-MCCH and SC-MTCH are mapped, blind HARQ repetition or RLC repetition is not provided.

Figure 8:
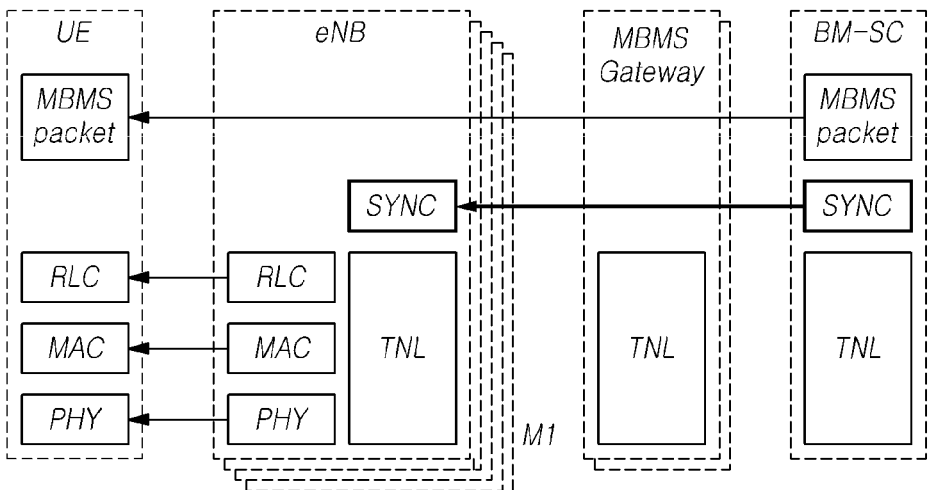
FIG. 8 is a view illustrating an MBMS user plane protocol architecture.

FIG. 8 is a view illustrating an MBMS user plane protocol architecture.

Referring to FIG. 8, in an LTE network, MBMS user data is transmitted between a broadcast multicast service center (BM-SC) and a UE through a mobile communication network. Accordingly, a corresponding packet may not be an IP packet. Further, only broadcast transmission scheme was supported in LTE MBMS. Therefore, the protocol structure was designed based on RLC-UM without using the PDCP layer that provides header compression or security functions.

High Layer Functional Split/Base Station Split Structure

NR may provide a split structure that splits a base station (gNB) into a central unit (hereinafter, referred to as 'gNB-CU' for convenience of description) and a distributed unit (hereinafter, referred to as 'gNB-DU' for convenience of description) to support efficient network construction.

Figure 9:
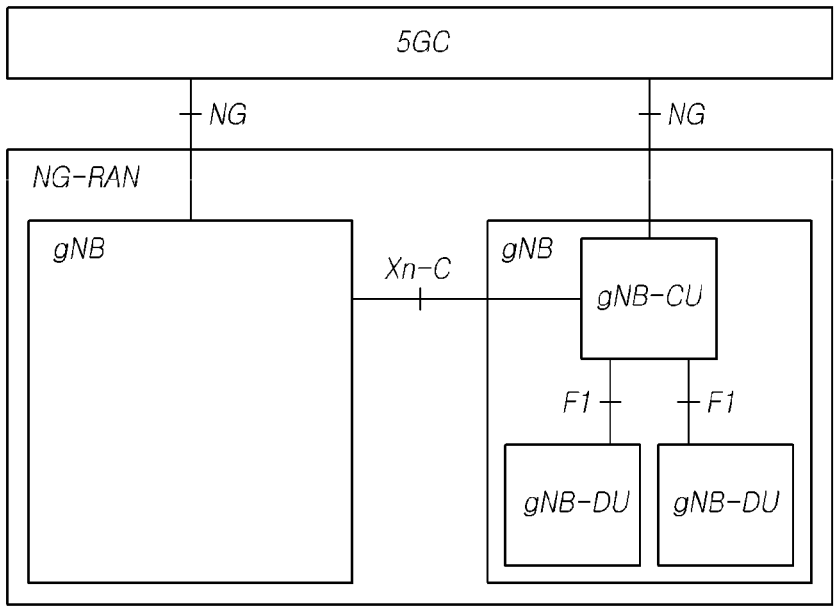
FIG. 9 is a view illustrating an overall NG-RAN architecture.

FIG. 9 is a view illustrating an overall NG-RAN architecture.

Referring to FIG. 9, a next-generation radio network may include one set of base stations connected to the 5G core network (5GC) through a NG interface. The base stations are connected to each other through an Xn interface. One base station may be constituted of one gNB-CU and one or more gNB-DUs. The gNB-CU and the gNB-DU are connected to each other through a F1 interface. One gNB-DU may be connected to only one gNB-CU. A NG interface and an Xn-C interface for one base station constituted of the gNB-CU and the gNB-DU are terminated at the gNB-CU. The gNB-DUs connected with the gNB-CU are shown as only one base station to other base stations and the 5GC. The gNB-CU is a logical node hosting RRC, SDAP, and PDCP protocols of the base station. The gNB-DU is a logical node hosting RLC, MAC and PHY layer of the base station. One gNB-DU supports one or more cells. One cell is supported by only one gNB-DU. The node hosting the user plane part of the NR PDCP should perform user inactivity monitoring and notify the node having control plane connection of inactivity or (re)activation. The node hosting the NR RLC may perform user inactivity monitoring and notify the control plane hosting node of inactivity (re)activation.

As such, according to the user plane protocol structure in the 5G/NR radio network using the base station split structure, the gNB-CU and the gNB-DU are connected through the F1 interface between PDCP and RLC.

3GPP Rel-15 and Rel-16, which provide NR standards, do not disclose technical content for multicast/broadcast service (MBS). In particular, from the user plane structure point of view, the base station split structure is constituted of the gNB-CU hosting PDCP and the gNB-DU hosting RLC or lower. When the 5G/NR radio network is separately established, no method has been provided for transmitting multicast/broadcast service data.

The disclosure introduces a method and device for effectively separately processing multicast/broadcast service data in a 5G/NR radio network.

Hereinafter, embodiments of a method for providing an NR radio access technology-based multicast/broadcast service (MBS) continuity will be described. However, this is for convenience of description, and the embodiments may be applied to any radio access technology. For example, the embodiments may be applied to radio access networks that provide base station split on any layer (e.g., PHY, MAC, RLC, or PDCP). The embodiment described in the disclosure may include the content of information elements and operations set forth in TS 38.321, the 3GPP NR MAC standard, and TS 38.331, the NR RRC standard. Although the disclosure does not contain the content of the UE operation related to the detailed definitions for the corresponding information elements, the content set forth in the standards may be incorporated in the disclosure.

Figure 10:
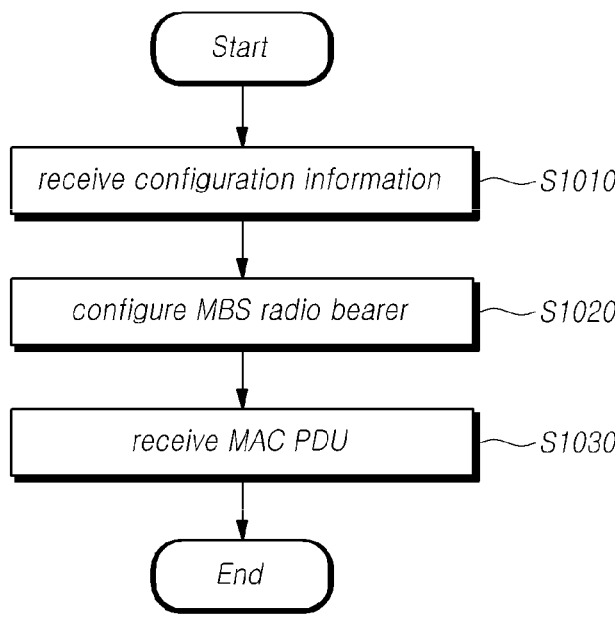
FIG. 10 is a flowchart for describing operations of a UE according to an embodiment.

FIG. 10 is a flowchart for describing operations of a UE according to an embodiment.

Referring to FIG. 10, a UE receiving multicast/broadcast service (MBS) data may perform the step of receiving configuration information for receiving MBS session data from the base station (S1010).

For example, the UE may perform various operations to receive MBS session data, such as configuration of an MBS radio bearer, identification of the associated logical channel, and identification of the MBS quality-of-service (QoS) flow. Accordingly, the UE may previously receive configuration information for receiving MBS session data from the base station.

According to an embodiment, the configuration information for receiving MBS session data may be included in an RRC reconfiguration message and received by the UE. According to another embodiment, the configuration information for receiving MBS session data may be received through an MBS control channel (MCCH) message. MCCH is a channel for transferring MBS control information, but is not limited to the term.

The configuration information for receiving MBS session data may include various pieces of information necessary for the UE to receive the MBS session data. For example, the configuration information for receiving MBS session data may include MBS radio bearer identifier information. The MBS radio bearer identifier information may include identification information for identifying the radio bearer used for the UE to receive MBS session data. Further, the logical channel identifier associated with the MBS radio bearer may include identification information indicating one or more logical channels associated to the radio bearer used for the UE to receive MBS session data. The configuration information for receiving MBS session data may include both the MBS radio bearer identifier and the logical channel identifier associated with the MBS radio bearer.

According to an embodiment, the MBS radio bearer identifier may be configured in association with at least one of the MBS session identification information and the MBS QoS flow identification information. In other words, the MBS radio bearer identifier may be allocated in association with the MBS session identification information for identifying the MBS session. Alternatively, the MBS radio bearer identifier may be allocated in association with QoS flow identification information indicating the MBS QoS flow. Or the MBS radio bearer identifier may be configured in association with both the MBS session identification information and MBS QoS flow identification information.

According to an embodiment, the logical channel identifier associated with the MBS radio bearer may be allocated as a value distinct from the logical channel identifier allocated to the unicast radio bearer for the DL-SCH. For example, when logical channel identifiers 1-32 are allocated to unicast radio bearers for DL-SCH, logical channel identifiers associated with MBS radio bearers may be allocated values other than 1-32.

According to another embodiment, the logical channel identifier associated with the MBS radio bearer may be allocated using an extended logical channel ID (LCID). For example, the logical channel identifier associated with the MBS radio bearer may be allocated using a 1-octet or 2-octet extended LCID (eLCID) value on the DL-SCH.

Thus, the logical channel identifier associated with the MBS radio bearer may be distinguished from the unicast radio bearer.

Meanwhile, the UE may perform the step of configuring an MBS radio bearer for receiving MBS session data based on the configuration information (S1020).

The UE may configure an MBS radio bearer in the UE based on the configuration information received from the base station. As described above, the UE configures an MBS radio bearer for receiving MBS session data by using the MBS radio bearer identifier and the logical channel identifier associated with the MBS radio bearer. When configuring the MBS radio bearer, the UE may configure the MBS radio bearer by identifying MBS session identification information or MBS QoS flow identifier configured in association with the MBS radio bearer identifier included in the configuration information.

As described above, the logical channel identifier associated with the MBS radio bearer may be allocated a value distinct from the logical channel identifier for the unicast radio bearer. Alternatively, the logical channel identifier associated with the MBS radio bearer may be allocated as an extended LCID codepoint/index.

The UE may perform the step of receiving a MAC protocol data unit (PDU) in which two or more different logical channels associated with the same group-radio network temporary identifier (G-RNTI) are multiplexed (S1030).

The UE may receive the MAC PDU in which the plurality of logical channels configured in association with one G-RNTI are multiplexed, from the base station. Two or more different logical channels may be multiplexed in the MAC PDU.

Thus, the UE may receive MBS session data through the MBS radio bearer.

Figure 11:
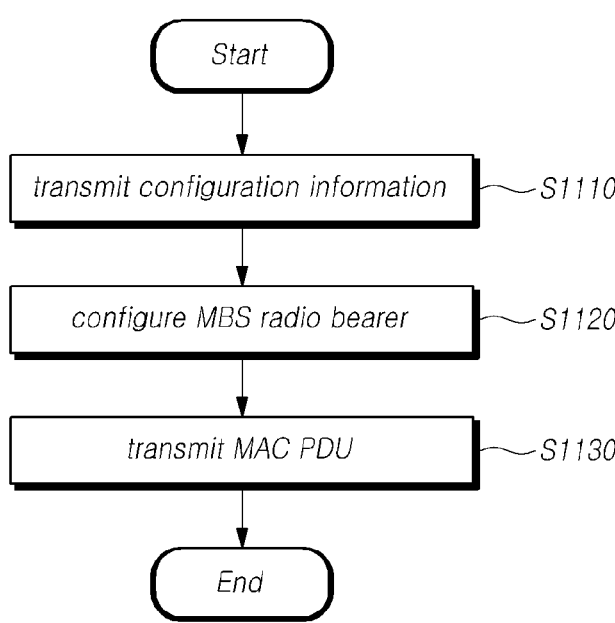
FIG. 11 is a flowchart for describing operations of a base station according to an embodiment.

FIG. 11 is a flowchart for describing operations of a base station according to an embodiment.

Referring to FIG. 11, the base station transmitting multicast/broadcast service (MBS) data may perform the step of transmitting configuration information to a UE for enabling the UE to receive MBS session data (S1110).

According to an embodiment, the configuration information for receiving MBS session data may be included in an RRC reconfiguration message and transmitted to the UE. According to another embodiment, the configuration information for receiving MBS session data may be transmitted through an MBS control channel (MCCH) message.

The configuration information for receiving MBS session data may include various pieces of information necessary for enabling the UE to receive the MBS session data. For example, the configuration information for receiving MBS session data may include MBS radio bearer identifier information. The MBS radio bearer identifier information may include identification information for identifying the radio bearer used for the UE to receive MBS session data. Further, the logical channel identifier associated with the MBS radio bearer may include identification information indicating one or more logical channels associated to the radio bearer used for the UE to receive MBS session data. The configuration information for receiving MBS session data may include both the MBS radio bearer identifier and the logical channel identifier associated with the MBS radio bearer.

According to an embodiment, the MBS radio bearer identifier may be configured in association with at least one of the MBS session identification information and the MBS QoS flow identification information. In other words, the MBS radio bearer identifier may be allocated in association with the MBS session identification information for identifying the MBS session. According to another embodiment, the MBS radio bearer identifier may be allocated in association with QoS flow identification information indicating the MBS QoS flow. According to still another embodiment, the MBS radio bearer identifier may be configured in association with both the MBS session identification information and MBS QoS flow identification information.

According to an embodiment, the logical channel identifier associated with the MBS radio bearer may be allocated as a value distinct from the logical channel identifier allocated to the unicast radio bearer for the DL-SCH. For example, when logical channel identifiers 1-32 are allocated to unicast radio bearers for DL-SCH, logical channel identifiers associated with MBS radio bearers may be allocated values other than 1-32.

According to another embodiment, the logical channel identifier associated with the MBS radio bearer may be allocated using an extended logical channel ID (LCID). For example, the logical channel identifier associated with the MBS radio bearer may be allocated using a 1-octet or 2-octet extended LCID (eLCID) value on the DL-SCH.

The base station may perform the step of configuring an MBS radio bearer for transmitting MBS session data based on the configuration information (S1120).

The base station may configure an MBS radio bearer for transmitting MBS session data to the UE. In configuring the MBS radio bearer, the base station may use information included in the configuration information transmitted to UE. Thus, the base station and the UE may configure an MBS radio bearer.

As described above, the base station may use the MBS radio bearer identifier and the logical channel identifier associated with the MBS radio bearer when configuring the MBS radio bearer. Further, the base station may configure an MBS radio bearer by configuring the MBS session identification information or MBS QoS flow identifier in association with the MBS radio bearer identifier.

The execution order of steps S1110 and S1120 may be changeable. For example, the base station may configure an MBS radio bearer to transmit MBS session data to the UE and may generate and transmit configuration information for the configured MBS radio bearer to the UE. In other words, step S1110 may be performed after step S1120. For convenience of description, step S1120 was described to be performed after step S1110. However, the embodiments of the disclosure are not limited thereto. For example, step S1110 may be performed after step S1120 according to another embodiment.

The base station may perform the step of transmitting a MAC protocol data unit (PDU) in which two or more different logical channels associated with the same group-radio network temporary identifier (G-RNTI) are multiplexed (S1130).

The UE may receive the MAC PDU in which the plurality of logical channels configured in association with one G-RNTI are multiplexed, from the base station. Two or more different logical channels may be multiplexed in the MAC PDU. Thus, the UE may receive MBS session data through the MBS radio bearer.

Hereinafter, various embodiments and specific operations of each step of the UE and the base station will be described in more detail. The embodiments described below may be applied individually or in any combination thereof.

An Embodiment Using Header Compression and/or gNB-CU and gNB-DU Split Structure by Adding PDCP to the User Plane Protocol Structure Between the UE and the Base Station (gNB) for MBS User Data Transmission In typical LTE, MBMS was designed to provide media (e.g., video or audio) services, such as TV broadcasting and public safety services. Accordingly, multicast mode, which requires complex group management, is not supported, but only broadcast mode is supported. Therefore, the LTE MBMS-based media service was able to broadcast media data within a specific area without using IP multicast technology.

However, multicast/broadcast technology in the 5G network requires support of various applications, such as public safety, V2X applications, transparent IPv4/IPv6 multicast delivery, IPTV, software delivery over wireless, group communications and IoT applications. In other words, the 5G network needs to support both small-scale multicast transmission and large-scale multicast/broadcast transmission. Further, 5G networks need to support transparent transmission of IP multicast to utilize IPTV facilities through mobile communication networks as IPTV is in wide use.

Accordingly, it may be desirable for 5G networks to utilize typical IP transmission technologies. In this case, it is necessary to reduce the overhead on the IP header from the viewpoint of overall data transmission efficiency.

To that end, it is preferable to add a PDCP layer on a radio interface (Uu interface) between a base station and a UE for MBS session data transmission. In other words, it may be effective to increase transmission efficiency using the header compression technology provided by PDCP. For example, PDCP on the MBS radio bearer may support header compression. Or, when configuring the MBS radio bearer in the UE, the base station may include and transmit information indicating whether to add a PDCP entity on the RRC dedicated message/RRC common message/NR MBS control channel. Thus, the UE may configure an MBS radio bearer with or without a PDCP entity.

Further, by using PDCP, it enables configuration and application of a normal radio bearer transferred in the unicast mode in the gNB-CU and gNB-DU split structure and an MBS radio bearer transferred in the multicast/broadcast mode, even for MBS session data transmission.

For convenience of description, the radio bearer for transmitting MBS session data is referred to as an MBS radio bearer. This is merely for convenience of description and it may be replaced with any other term. The MBS radio bearer may represent a multicast/broadcast/point-to-multipoint radio bearer for transmitting data included in a corresponding MBS session.

The MBS radio bearer may be a downlink dedicated radio bearer. The MBS radio bearer used in multicast/broadcast transfer mode may support only RLC UM. As described above, the gNB-CU and gNB-DU are connected through the F1 interface between the hosting PDCP and RLC layers that they, respectively, host. If PDCP is used for the MBS radio bearer, it is possible to easily support MBS session data transmission under a base station split structure.

Embodiment of Supporting 1-to-1 Mapping, 1-to-N Mapping, and N-to-1 Mapping Between MBS Sessions and MBS Radio Bearers In the LTE-based MBMS transmission technology, one MBMS session is mapped to one radio bearer in a one-to-one manner and transmitted to the UE through the base station. One MBMS session is distinguished from the TMGI for identifying the same by (optional) session identifier (sessionId) and is mapped to one MBMS point to multipoint radio bearer (MRB) and transmitted through the radio interface between the base station and the UE.

Meanwhile, 5G supports QoS processing in flow units. It may be desirable to support QoS processing in flow units, in the same way, for the MBS service.

For convenience of description, multicast sessions/services are described below. This is merely for convenience of description, and the same is also applicable to broadcast session/services. Therefore, broadcast sessions/services are also included in the scope of the present embodiments.

In the 5G mobile communication network, a PDU session represents an association between a UE providing PDU connectivity service and a data network. The current PDU session represents a unicast-based session and is configured UE-specifically. Therefore, the core network entity or base station has unicast session information and may manage the UE context UE-specifically provided. On the other hand, in the case of the multicast session/service, it may represent a session for one or more UEs/UE group/group UEs belonging to the multicast session/service. The core network entity or base station may manage the multicast session context, core network entity-specifically, base station-specifically, or cell-specifically for the corresponding multicast session/service.

In the core network entity or base station, the multicast session context may be identified through the identifier (e.g., multicast context identifier) for identifying the same. The multicast context associated with one multicast session may include at least one of one multicast address (e.g., IP multicast address or MAC multicast address or any identifier/address for identifying the group), information (e.g., TMGI or session ID) for identifying the corresponding multicast session, geographical area information (e.g., cell ID list, service area code list, service area id list, zone id list) where the corresponding multicast session is to be transmitted, and information (e.g., UE identity list, 5G-S-TMSI list, C-RNTI list or I-RNTI list) for identifying the UE configured with the MBS radio bearer correspond to/authenticated in the service correspond to/interested in/subscribed to/belonging to the corresponding multicast session.

The core network entity or base station may manage in association with the information for identifying the corresponding multicast session on the UE context provided UE-specifically, for the UE configured with the MBS radio bearer correspond to/authenticated in the session service/interested in/subscribed to/belonging to the corresponding multicast session. The base station may configure, in the UE, a UE-specific unicast radio bearer associated with the MBS radio bearer to transmit the corresponding multicast service/session data. Thus, the base station may change the MBS service/session data transfer scheme efficiently depending on the context and transmit it to the UE.

Figure 12:
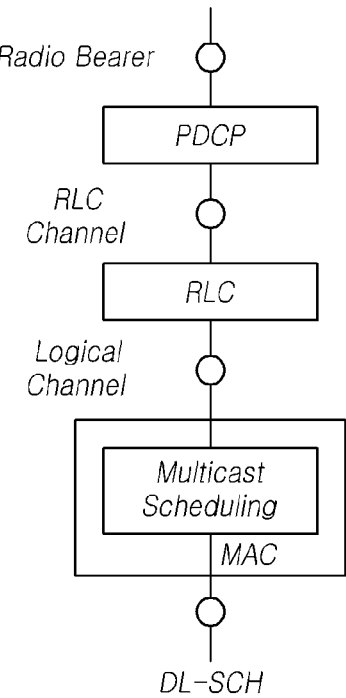
FIG. 12 is a view illustrating an example of a layer 2 structure for transmitting/receiving MBS data.

FIG. 12 is a view illustrating an example of a layer 2 structure for transmitting/receiving MBS data.

Referring to FIG. 12, the MBS radio bearer is described. The MBS radio bearer for MBS session data transmission may transmit the data included in the MBS session by multicast/broadcast/point-to-multipoint through multicast/broadcast scheduling in the MAC entity. A common RNTI (e.g., G-RNTI) may be used to identify transmission of corresponding MBS session data. Based on the common RNTI, a group-common PDSCH may be scrambled. For multicast/broadcast scheduling on the group-common PDSCH, a group-common PDCCH scrambled by the G-RNTI may be used.

FIG. 13 is a view illustrating another example of a layer 2 structure for transmitting/receiving MBS data.

Hereinafter, another example of the MBS radio bearer will be described with reference to FIG. 13. The MBS radio bearer for MBS session data transmission may transmit the data included in the MBS session by multicast/broadcast/point-to-multipoint through multicast/broadcast scheduling in the MAC entity. A common RNTI (e.g., G-RNTI) may be used to identify transmission of corresponding MBS session data. Based on the common RNTI, a group-common PDSCH may be scrambled. For multicast/broadcast scheduling on the group-common PDSCH, a group-common PDCCH scrambled by the G-RNTI may be used. Further, the MBS radio bearer may transmit the data included in the corresponding MBS session by unicast/point-to-point through unicast scheduling in the MAC entity. A UE-specific RNTI (e.g., C-RNTI) may be used to identify transmission of corresponding MBS session data. The PDSCH may be scrambled based on C-RNTI. For unicast scheduling of the PDSCH, a PDCCH CRC-scrambled by C-RNTI may be used.

As shown in FIG. 13, the MBS radio bearer may have a split structure having two legs/paths/RLC bearers. Unicast scheduling may be performed in the MAC entity for point-to-point transmission in one leg/path/RLC bearer of the MBS radio bearer. An RLC entity of a unicast leg/path/RLC bearer may be configured in association with a logical channel identifier. Multicast/broadcast scheduling may be performed in the MAC entity for point-to-multipoint transmission in the other leg/path/RLC bearer of the MBS radio bearer. An RLC entity of a multicast/broadcast leg/path/RLC bearer may be configured in association with a logical channel identifier.

The RLC entity of the unicast leg/path/RLC bearer and the RLC entity of the multicast/broadcast point-to-multipoint leg/path/RLC bearer may be associated with one common PDCP entity. Or, the RLC entity of the unicast leg/path/RLC bearer and the RLC entity of the multicast/broadcast point-to-multipoint leg/path/RLC bearer may be associated with different PDCP entities, respectively, which are synchronized with each other.

The radio bearer for the unicast leg/path associated with the MBS radio bearer may be configured as a downlink-dedicated radio bearer. Accordingly, for L2 configuration information, such as MAC configuration information, RLC configuration information, PDCP configuration information, and SDAP configuration information included in a unicast leg/path, only downlink-dedicated configuration information may be included and configured. Or, the radio bearer for the unicast leg/path associated with the MBS radio bearer may be configured as a normal radio bearer including downlink/uplink.

In FIG. 13, the radio bearer for the unicast leg/path associated with the MBS radio bearer may represent a radio bearer including the leg/path/RLC bearer transmitting data included in the MBS service/session through unicast/point-to-point through unicast scheduling in the MAC entity. According to an embodiment, the radio bearer for the unicast leg/path associated with the MBS radio bearer may represent the data radio bearer including the PDCP-RLC-MAC (unicast scheduling) entity. According to another embodiment, the radio bearer for the unicast leg/path associated with the MBS radio bearer may represent the RLC bearer including the RLC-MAC (unicast scheduling) entity.

One MBS session may include one or more multicast/broadcast flows. The MBS flow may be identified through the MBS QoS flow identifier. NR supports QoS processing in radio bearer units. NR may map the MBS QoS flow received from the core network to the MBS radio bearer using the SDAP and transmit it to support MBS session data transmission.

As an example, one MBS QoS flow belonging to one MBS session may be mapped to one MBS radio bearer. As another example, one or more MBS QoS flows belonging to one MBS session may be mapped to one MBS radio bearer. As still another example, one or more MBS QoS flows belonging to one or more MBS sessions may be mapped to one or more MBS radio bearers. As further another example, one or more MBS QoS flows belonging to one or more MBS sessions may be mapped to one MBS radio bearer.

However, if all of the above-described cases are supported, related specifications and operations may be significantly complicated. In each case, the methods described below may be used individually or in combination.

An Embodiment of Separately Transmitting Data Per MBS QoS Flow

For convenience of description, it is assumed in the following description that MBS session-A includes MBS QoS flow-1 and MBS QoS flow-2, and MBS session-B includes MBS QoS flow-3, MBS QoS flow-4, and MBS QoS flow-5.

If MBS QoS flow-1 belonging to MBS session-A and MBS QoS flow-3 belonging to MBS session-B have similar traffic characteristics (e.g., QCI/5QI are the same), it may be efficient to multiplex data belonging to the QoS flows and transmit it. In this case, if different MBS QoS flows included in different MBS sessions are multiplexed and transmitted through one multicast traffic channel, the UE needs to separate the different MBS QoS flows received through the multicast traffic channel and transfer them to the higher layer through the corresponding MBS session.

The data belonging to a plurality of MBS sessions may be transmitted through one transport channel using one radio network temporary identifier (RNTI). For convenience of description, the RNTI for the purpose is denoted as first G-RNTI. This is for ease of description, and it may be replaced with another term. The UE may identify (multiple/any) MBS session data transmission transmitted through the MBS traffic channel using one first G-RNTI. The first G-RNTI (or the MBS session data addressed by the first G-RNTI) may be transmitted on the DL-SCH. Or, the first G-RNTI (or the MBS session data addressed by the first G-RNTI) may be transmitted on the transport channel for MBS session data transmission distinct from the DL-SCH. The transport channel distinct from the DL-SCH may be newly defined. The (time/frequency) radio resource configuration of the transport channel newly defined may be indicated to the UE by the base station. For convenience of description, the transport channel that may be newly defined is denoted as an MBCH transport channel. This is for ease of description, and it may be replaced with another term.

The MBS QoS flow belonging to each MBS session may be associated with one logical channel identifier. For example, in the above-described embodiment, MBS QoS flow-1 and MBS QoS flow-3 which have similar traffic characteristics (e.g., QCI/5QI are the same) may be configured with the same downlink LCID value. MBS QoS flow-2, MBS QoS flow-4, and MBS QoS flow-5 may be configured with different downlink LCID values. For example, the LCID of MBS QoS flow-1 may be set to 420, the LCID of MBS QoS flow-2 to 321, the LCID of MBS QoS flow-3 to 320, the LCID of MBS QoS flow-4 to 322, and the LCID of MBS QoS flow-5 to 323.

The above-described MBS traffic logical channels may be differentiated according to (in association with) the traffic characteristics (e.g., QCI/5QI) of the MBS session data. The logical channel identifier may be indicated to the UE through at least one of an RRC dedicated message (e.g., RRC reconfiguration), an RRC common message (e.g., SIB), and an NR MBS control channel (MCCH) by the base station.

However, the LCID information field for the DL-SCH is 6-bit long so that the value allocatable to the logical channel for the MBS session data may not be sufficient.

FIG. 14 is a view illustrating a logical channel identifier value according to an embodiment.

Referring to FIG. 14, 0 is used as the LCID value for DL-SCH, 1-32 are used as the logical channel identifier of the radio bearer, and 33 or 34 is used to use the extended logical channel ID. Since the LCID is also used to distinguish various MAC CEs, only 12 values (35-46) are currently reserved among 6-bit values (0 to 63).

As described above, the MBS session may be used for a variety of applications. Therefore, to provide multiple MBS sessions within one cell, multiple G-RNTIs need to be provided to distinguish multiple MBS sessions. Or, multiple MBS radio bearers associated with multiple MBS sessions need to be provided. Or, multiple logical channel identifiers need to be provided to distinguish multiple MBS radio bearers. To distinguish and transmit MBS data, the following embodiments may be used individually or in combination.

According to an embodiment, as described above, an MBCH transport channel distinct from the DL-SCH may be defined so that the logical channel identifier may be allocated using six bits in the corresponding transport channel. For example, in a range of the separated LCID values independently distinct from the existing LCID values for DL-SCH (the LCID values 0-63 codepoint/index for the existing DL-SCH or the LCID values 1-32 for the unicast radio bearer (SRB, DRB) in the existing DL-SCH), the MBS traffic logical channels associated with the MBS radio bearer are differentiated using six bits (or n bits, where n is any natural number equal to or smaller than 6) to transmit/receive data.

According to another embodiment, the logical channel identifier may be set using a 1-octet or 2-octet extended LCID (eLCID) value on the DL-SCH.

FIG. 15 is a view exemplarily illustrating a MAC sub-header format including an extended LCID field according to an embodiment.

Referring to FIG. 15, the MAC subheader may be con-figured in a format 1500 including an extended LCID which is one octet extended from the typical LCID. Or, the MAC subheader may be configured in a format 1510 including an extended LCID which is two octet extended from the typical LCID.

The extended LCID is one for addressing shortage of LCID used for identifying the MAC SDU or MAC CE in the MAC header/subheader. According to the MAC subheader format as shown in FIG. 15, the eLCID field may have eight bits (one octet) or 16 bits (two octets).

FIG. 16 is a view illustrating allocation information according to each octet length of an extended LCID value for a DL-SCH according to an embodiment.

Referring to FIG. 16, since some values of the 1-octet eLCID table 1610 are reserved, the reserved values may be used. Alternatively, in the case of using the 2-octet eLCID table 1600, an arbitrary value may be set and used.

Therefore, the base station may use the extended LCID for the logical channel identifier associated with the MBS radio bearer. According to an embodiment, when the base station uses the extended LCID (eLCID), any value among the 2-octet eLCIDs may be designated and allocated, or a reserved value among the 1-octet eLCIDs (codepoint: 0-244/index: 64-308) may be designated and allocated.

According to another embodiment, the base station may use a fixed (one) LCID value (on DL-SCH/MBCH). For example, among the LCID 6-bit values (0 to 63) used for DL-SCH, one or more values among currently reserved 35-46 values may be designated/fixed and used. In the typical DL-SCH, LCID values may be used in a separated LCID space (35-46) that is independently distinct from the LCID space (1-32) for unicast radio bearers (SRB, DRB). In other words, the logical channel identifier associated with the MBS radio bearer may be allocated as a value distinct from the logical channel identifier allocated to the unicast radio bearer for the DL-SCH.

According to the embodiments, it is possible to differen-tiate the RLC entity of the unicast leg/path/RLC bearer and the RLC entity of the multicast leg/path/RLC bearer for the MBS radio bearer as shown in FIG. 13, using the logical channel identifier.

The MBS session data transmission is provided only on downlink. Accordingly, although one fixed value is used, no issue arises when the base station differentiates QoSs according to the QoS flow characteristics and performs scheduling and priority processing. The UE may transfer the MBS session data (MAC PDU), addressed by the G-RNTI and received, from the UE's MAC to the associated RLC entity. The RLC entity denotes the RLC entity configured in association with the MBS radio bearer. To that end, the RLC entity may be configured in association with the G-RNTI.

According to another embodiment, the MBS session data may be transmitted with a new MAC subheader distinct from the existing MAC subheader, on the DL-SCH. Or, the MBS session data may be transmitted, with a specific value designated in any field included in the typical MAC sub-header. The corresponding MAC subheader may include one or more fields of the MBS QoS flow identifier, MBS service/session identification information, MBS radio bearer identification information, logical channel identification information, length, G-RNTI, and information for indicating transmission/reception of data with MBS traffic logical channels associated with the MBS radio bearer differentiated using the separated LCID space (value) distinct from the LCID space (value) for DL-SCH. Or, the MAC subheader may include code information obtained by mapping/coding any information described above.

Thus, data may be transmitted/received with the MBS traffic logical channels associated with the MBS radio bearer differentiated using the separated LCID value independently distinct from the existing LCID value for DL-SCH. The information for indicating transmission/reception of data with the MBS traffic logical channels associated with the MBS radio bearer differentiated using the separated LCID value independently distinct from the LCID value for DL-SCH may include information for indicating that the LCID field used in the MAC subheader is for identifying the logical channel instance of the MBS traffic (MBS MAC SDU). Or, the information for indicating transmission/re-ception of data with the MBS traffic logical channels asso-ciated with the MBS radio bearer differentiated may include information for indicating that the MAC SDU includes the MBS MAC SDU.

The UE may control to use the MAC subheader for the data (MAC PDU) received through the first G-RNTI on the DL-SCH. The MAC subheader may designate a specific fixed value in the LCID field and use it. Thus, the UE may recognize that the MAC SDU is the MBS MAC SDU and process data.

As described above, as the LCID, one of the currently reserved values (35-46) of the six-bit values (0-63) may be designated. Or, as one of the fields included in the MAC subheader, a specific value may be designated and used to differentiate it. As another example, a new MAC subheader, distinct from the MAC subheader included in the existing DL-SCH, may be defined and transmitted on the MBCH. The new MAC subheader may include one or more fields of the MBS QoS flow identifier, MBS session identification information, MBS radio bearer identification information, logical channel identification information, length, G-RNTI, and information for indicating transmission/reception of data with MBS traffic logical channels associated with the MBS radio bearer differentiated using the separated LCID space value independent/distinct from the LCID space for DL-SCH. Or, the new MAC subheader may include code information obtained by mapping/coding any information described above.

The MBS session data transmission is provided only on downlink. The UE may differentiate the MBS session data based on the information included in the MAC subheader for the received MAC PDU and transmit it to the higher layer. For example, corresponding data may be separately trans-mitted through association between two pieces of informa-tion among the MBS QoS flow identifier, MBS session identification information, MBS radio bearer identification information, logical channel identification information, length, G-RNTI, and information for indicating transmis-sion/reception of data with MBS traffic logical channels associated with the MBS radio bearer differentiated using the separated LCID space value independent/distinct from the LCID space for DL-SCH, on any sub L2 (MAC/RLC/PDCP/SDAP).

The base station may include the corresponding informa-tion in an RRC dedicated message (e.g., RRC reconfiguration), an RRC common message (e.g., SIB), and an NR MBS control channel (MCCH) and transmit it. In other words, the above-described information on the new MAC subheader may correspond to the configuration information described in connection with FIGS. 10 and 11.

According to another embodiment, the logical channel identifier may be set to use 1-octet/2-octet extended LCID (eLCID) on the DL-SCH. For example, the base station may differentiate and transmit the data belonging to the MBS session using a different RNTI for each MBS QoS flow. The corresponding information may be indicated to the UE through at least one of an RRC dedicated message (e.g., RRC reconfiguration), an RRC common message (e.g., SIB), and an NR MBS control channel (MCCH) by the base station.

According to another embodiment, the UE (or the MAC entity of the UE) (interested in the corresponding MBS session) may monitor the PDCCH for the first G-RNTI. When receiving downlink allocation (or downlink control information) on the PDCCH for the first G-RNTI, the UE attempts to decode the received data. If the UE (or the MAC entity of the UE) decode successfully, the UE may transfer the decoded MAC PDU to the disassembly and demultiplexing entity. The UE (or the MAC entity of the UE, or the disassembly and demultiplexing entity of the UE) may transfer the MAC PDU to the RLC entity associated with the corresponding G-RNTI and LCID. The RLC entity may transfer it to the associated PDCP entity. If associated with the SDAP entity without the PDCP entity, the RLC entity may directly transfer it to the SDAP entity.

According to another embodiment, the SDAP entity may differentiate and transfer different MBS QoS flows in the received data. To that end, an information field for identifying the MBS QoS flow may be defined and included in the SDAP header. Further, a related operation may also be defined in the newly defined field. The information for identifying the MBS QoS flow may be configured to have six-bit values (0-63) in the PDU session, like the QoS flow identifier. According to another embodiment, the information for identifying the MBS QoS flow may be configured to have a value (e.g., a value of one of 7 bits, 8 bits, . . . , 16 bits) larger than six bits. Since the QoS flow identifier is used UE-specifically in the PDU session, six bits may be enough to identify the corresponding QoS flow. However, since the MBS session may be set/configured core network entity (SMF/AMF)/base station/cell-specifically, and six bits may be insufficient.

According to another embodiment, the SDAP entity may differentiate and transfer different MBS QoS flows, belonging to different MBS sessions, in the received data. To that end, the typical SDAP header (SDAP data PDU format including the SDAM header) may be added/modified/changed. For example, the information for identifying the MBS session may be added to the SDAP header (the SDAP data PDU format including the SDAP header). As another example, one SDAP entity may be configured for a plurality of MBS sessions. As another example, for the MBS session, a dynamic MBS QoS flow identifier, allocated by the core network (SMF/AMF)/base station, may be used rather than the same value as the 5QI. Any MBS QoS flow included in the MBS service/session provided in one core network/base station may be configured to have different QoS flow identifiers. The MBS session identification information and the MBS QoS flow identification information may be allocated in association with each other. As another example, information for indicating use of the dynamic MBS QoS flow identifier allocated by the core network (SMF/AMF)/base station, rather than 5QI, for the MBS session may be added to the SDAP header (the SDAP data PDU format including the SDAP header).

According to another embodiment, the base station may include the information for indicating whether to use the SDAP header in at least one of an RRC dedicated message (e.g., RRC reconfiguration), an RRC common message (e.g., SIB), and an NR MBS control channel and transmit it.

According to another embodiment, the 1-32 values used as the logical channel identifier of the existing unicast radio bearer (SRB, DRB) on the DL-SCH may be used as the logical channel identifier of the MBS radio bearer. For example, the RLC entity on the multicast point-to-multipoint leg may be configured in association with the logical channel identifier having one value among the 1-32 values. As another example, the RLC entity on the unicast point-to-point leg may be configured in association with the logical channel identifier having one value among the 1-32 values.

The RLC entity on the multicast/broadcast point-to-multipoint leg and the RLC entity on the unicast point-to-point leg may have the same logical channel identifier. Even in this case, since the RNTIs addressing the PDSCH on the multicast point-to-multipoint leg and the unicast point-to-point leg differ, the MAC entity may identify it and transfer it to the RLC entity. Or, the RLC entity on the multicast point-to-multipoint leg and the RLC entity on the unicast point-to-point leg may have different logical channel identifiers. Although the RNTIs addressing the PDSCH on the multicast point-to-multipoint leg and the unicast point-to-point leg differ, if this is considered by the MAC (de) multiplexing entity, it may be difficult to perform per-layer independent operations. Thus, it may be preferable to configure them with different logical channel identifiers. Accordingly, information (e.g., G-RNTI) for differentiating them may be included in the MAC subheader. Thus, the corresponding MBS session data may be transferred to the RLC entity.

If point-to-multipoint (PTM) initial transmission/reception through multicast point-to-multipoint leg fails, HARQ retransmission may be performed through the unicast point-to-point leg. The corresponding transport block/data may be transmitted/received through the unicast point-to-point leg through the HARQ process where PTM initial transmission/reception fails. The PDSCH including the transport block/data may be addressed by the C-RNTI. The HARQ entity/process may transfer it to the (de)multiplexing entity, and the (de)multiplexing entity may transfer the MBS data received through retransmission to the RLC entity on the multicast point-to-multipoint leg based on the information (e.g., G-RNTI) included in the MAC subheader. Or, the HARQ entity/process may transfer it to the (de)multiplexing entity, and the (de)multiplexing entity may transfer the MBS data received through retransmission to the RLC entity on the unicast point-to-point leg.

Method for Separately Transmitting Data Per MBS Session

The following description is made based on the above-described embodiments for convenience of description. As described above, MBS session-A includes MBS QoS flow-1 and MBS QoS flow-2, and MBS session-B includes MBS QoS flow-3, MBS QoS flow-4, and MBS QoS flow-5.

Although MBS QoS flow-1 belonging to MBS session-A and MBS QoS flow-3 belonging to MBS session-B have similar traffic characteristics (e.g., QCI/5QI are the same), if the data belonging to the QoS flows are multiplexed and transmitted, the UE receiving the data (e.g., on the MAC or any sub L2) may be required to receive the MBS QoS flow traffic belonging to the MBS session the UE is interested in and discard/differentiate the data (received subPDU).

According to an embodiment, the base station may transmit the data belonging to a plurality of MBS sessions through one transport channel using one radio network temporary identifier (RNTI). For convenience of description, the RNTI used in this case is denoted as second G-RNTI. This is simply for ease of description, and it may be replaced with another term. It is possible to identify (multiple/any) MBS session data transmission transmitted through the MBS traffic channel using one second G-RNTI. The second G-RNTI (or the MBS session data addressed by the second G-RNTI) may be transmitted on the DL-SCH. Or, the second G-RNTI (or the MBS session data addressed by the second G-RNTI) may be transmitted on the transport channel for MBS session data transmission distinct from the DL-SCH. The corresponding transport channel may be newly defined in NR. The (time/frequency) radio resource configuration for the transport channel may be indicated to the UE by the base station.

According to another embodiment, the base station may associate each MBS session with one radio network temporary identifier (RNTI) and transmit the data belonging to the MBS session. For convenience of description, the RNTI in this case is denoted as third G-RNTI. This is simply for ease of description, and it may be replaced with another term.

It is possible to identify (multiple/any) MBS session data transmission transmitted through the MBS traffic channel using one second G-RNTI/third G-RNTI. The second G-RNTI/third G-RNTI (or the MBS session data addressed by the second G-RNTI/third G-RNTI) may be transmitted on the DL-SCH. Or, the second G-RNTI/third G-RNTI (or the MBS session data addressed by the second G-RNTI/third G-RNTI) may be transmitted on the transport channel for MBS session data transmission distinct from the DL-SCH. The corresponding transport channel may be newly defined in NR. The (time/frequency) radio resource configuration for the transport channel may be indicated to the UE by the base station. For convenience of description, this is referred to as MBCH transport channel. This is simply for ease of description, and it may be replaced with another term. The base station may include the corresponding information (e.g., the MBS service/session identification information and the third G-RNTI associated information, or MBS service/session identification information and logical channel identifier, MBS bearer identification information, third G-RNTI associated information, and inter-MBS QoS flow identifier associated information) in at least one of an RRC dedicated message (e.g., RRC configuration), an RRC common message (e.g., SIB), and an NR MBS control channel and transmit it.

According to another embodiment, the MBS QoS flow belonging to each MBS session may be associated with one logical channel identifier. The MBS traffic logical channels are differentiated according to the traffic characteristics (e.g., QCI/5QI) of the MBS session data, and the corresponding logical channel identifier may be indicated to the UE through at least one of the RRC dedicated message (e.g., RRC reconfiguration), RRC common message (e.g., SIB), and NR MBS control channel by the base station. The LCID information field for the DL-SCH is 6-bit long so that the value allocatable to the logical channel for the MBS session data is not sufficient. The following embodiments may be used individually or in combination.

According to an embodiment, as described above, an MBCH transport channel may be defined to be distinct from the DL-SCH so that the logical channel identifier may be allocated using six bits in the corresponding transport channel. For example, in the separated LCID space independently distinct from the existing LCID space for DL-SCH (the LCID space 0-63 codepoint/index for the existing DL-SCH or the LCID space 1-32 codepoint/index for the unicast radio bearer (SRB, DRB) in the existing DL-SCH), the MBS traffic logical channels associated with the MBS radio bearer are differentiated using six bits (or n bits, where n is any natural number equal to or smaller than 6) to transmit/receive data.

According to another embodiment, 1-octet/2-octet extended LCID (eLCID) on the DL-SCH may be used. Referring to FIG. 16, when the extended LCID is used, any value among the 2-octet eLCIDs may be designated and used, or a reserved value among the 1-octet eLCIDs (codepoint: 0-244/index: 64-308) may be designated and used.

According to another embodiment, a fixed (one) LCID value (on DL-SCH/MBCH) may be used. For example, among the LCID 6-bit values (0 to 63) used for DL-SCH, one or more values among currently reserved 35-46 values may be designated/fixed and used. In the existing DL-SCH, LCID values may be used in separated LCID values (35-46) that are independently distinct from the LCID values (1-32) for unicast radio bearers (SRB, DRB).

According to the embodiments, it is possible to differentiate the RLC entity of the unicast leg/path/RLC bearer and the RLC entity of the multicast leg/path/RLC bearer for the MBS radio bearer as shown in FIG. 13, using the logical channel identifier.

The MBS session data transmission is provided only on downlink. Accordingly, although one fixed value is used, no issue may arise when the base station differentiates QoSs according to the QoS flow characteristics and performs scheduling and priority processing. The UE may transfer the MBS data (MAC PDU), addressed by the G-RNTI and received, from the UE's MAC to the associated RLC entity. The RLC entity denotes the RLC entity configured in association with the MBS radio bearer. To that end, the RLC entity may be configured in association with the G-RNTI.

According to another embodiment, a new MAC subheader may be defined to be distinct from the existing MAC subheader and transmitted on the DL-SCH. Or, a specific value may be designated and transmitted in any field included in the existing MAC subheader. The newly defined MAC subheader may include one or more fields of the MBS QoS flow identifier, MBS session identification information, MBS radio bearer identification information, logical channel identification information, length, G-RNTI, and information for indicating transmission/reception of data with MBS traffic logical channels associated with the MBS radio bearer differentiated using the separated LCID space value independent/distinct from the LCID space for DL-SCH. Or, the MAC subheader may include code information obtained by mapping/coding any information described above.

The MAC subheader may be used for the data (MAC PDU) received through the third G-RNTI (or second G-RNTI) on the DL-SCH. The MAC subheader may designate a specific fixed value in the LCID and use it. Thus, the UE may recognize that the MAC SDU is the MBS MAC SDU and process data. As the LCID, one of the currently reserved values (35-46) of the six-bit values (0-63) may be allocated. Or, as one of the fields included in the MAC subheader, a specific value may be designated and used to differentiate it.

According to another embodiment, a new MAC subheader may be defined to be distinct from the MAC subheader included in the existing DL-SCH and transmitted on the MBCH. The corresponding MAC subheader may include one or more fields of the MBS QoS flow identifier, MBS session identification information, MBS radio bearer identification information, logical channel identification information, length, G-RNTI, and information for indicating transmission/reception of data with MBS traffic logical channels associated with the MBS radio bearer differentiated using the separated LCID space value independent/distinct from the LCID space for DL-SCH. Or, the MAC subheader may include code information obtained by mapping/coding any information described above. The MBS session data transmission is provided only on downlink. The UE may differentiate the MBS session data based on the information included in the MAC subheader for the received MAC PDU and transmit it to the higher layer. For example, the corresponding data may be differentiated and transmitted through association between any two pieces of information among the MBS QoS flow identifier, MBS session identification information, MBS radio bearer identification information, logical channel identification information, and G-RNTI, on any sub L2 (MAC/RLC/PDCP/SDAP). The base station may include the corresponding information in at least one of an RRC dedicated message (e.g., RRC reconfiguration), an RRC common message (e.g., SIB), and an NR MBS control channel (MCCH) and transmit it.

According to another embodiment, the base station may use 1-octet/2-octet extended LCID (eLCID) on the DL-SCH. According to another embodiment, the base station may transmit the data belonging to the MBS session using a different RNTI for each MBS QoS flow. The base station may include the corresponding information in at least one of an RRC dedicated message (e.g., RRC reconfiguration), an RRC common message (e.g., SIB), and an NR MBS control channel (MCCH) and transmit it.

According to another embodiment, in the base station, the MAC may multiplex only logical channels having one MBS session (or one piece of MBS session identification information) for the (MAC) PDU associated with one piece of downlink control information.

According to another embodiment, the UE (or the MAC entity of the UE) (interested in the corresponding MBS session) may monitor the PDCCH for the second G-RNTI/third G-RNTI. When receiving downlink allocation (or downlink control information) on the PDCCH for the second G-RNTI/third G-RNTI, the UE attempts to decode the received data. If the UE (or the MAC entity of the UE) successfully decode the data, the UE may transfer the decoded MAC PDU to the disassembly and demultiplexing entity. The UE (or the MAC entity of the UE, or the disassembly and demultiplexing entity of the UE) may transfer the MAC PDU to the RLC entity associated with the corresponding LCID. The RLC entity may transfer it to the associated PDCP entity. If associated with the SDAP entity without the PDCP entity, the RLC entity may directly transfer it to the SDAP entity.

According to another embodiment, the SDAP entity may differentiate and transfer different MBS QoS flows in the received data. To that end, an information field for identifying the MBS QoS flow may be defined and included in the SDAP header. Further, a related operation may also be defined in the corresponding field. The information for identifying the MBS QoS flow may be configured to have six-bit values (0-63) in the PDU session, like the QoS flow identifier. According to another embodiment, the information for identifying the MBS QoS flow may have a value (e.g., a value of one of 7 bits, 8 bits, . . . , 16 bits) larger than six bits. Since the QoS flow identifier is used UE-specifically in the PDU session, six bits may be enough to identify the corresponding QoS flow. However, since the MBS session may be set/configured core network entity (SMF/AMF)/base station/cell-specifically, and six bits may be insufficient.

According to another embodiment, the SDAP entity may differentiate and transfer different MBS QoS flows, belonging to different MBS sessions, in the received data. To that end, the typical SDAP header (SDAP data PDU format including the SDAM header) may be added/modified/changed. For example, the information for identifying the MBS session may be added to the SDAP header (the SDAP data PDU format including the SDAP header). As another example, one SDAP entity may be configured for a plurality of MBS sessions. As another example, an SDAP entity may be separately configured per MBS session. The MBS radio bearer may be configured per MBS session by the SDAP entity. One SDAP entity may be configured for an individual MBS session. To that end, the base station may include the MBS session identification information and MBS QoS flow identifier associated information in the SDAP configuration information and transmit it through at least one of an RRC dedicated message (e.g., RRC reconfiguration), RRC common message (e.g., SIB), and NR MBS control channel.

According to another embodiment, for the MBS session, a dynamic MBS QoS flow identifier, allocated by the core network (SMF/AMF)/base station, may be used rather than the same value as the 5QI. Any MBS QoS flow included in the MBS session provided in one core network/base station may be configured to have different QoS flow identifiers. The MBS session identification information and the MBS QoS flow identification information may be allocated in association with each other. According to another embodiment, information for indicating use of the dynamic MBS QoS flow identifier allocated by the core network (SMF/AMF)/base station, rather than 5QI, for the MBS session may be added to the SDAP header (the SDAP data PDU format including the SDAP header).

According to another embodiment, the base station may transmit the information for indicating whether to use the SDAP header through at least one of an RRC dedicated message (e.g., RRC reconfiguration), an RRC common message (e.g., SIB), and an NR MBS control channel (MCCH).

According to the embodiments described above, it is possible to separately process MBS session data in QoS flow units in the NR radio access network. Hereinafter, hardware and software configurations of a UE and a base station capable of performing the above-described embodiments will be described.

FIG. 17 is a block diagram illustrating a UE according to an embodiment.

Referring to FIG. 17, a UE 1700 receiving multicast/broadcast service (MBS) data includes a receiver 1730 for receiving configuration information for receiving MBS session data from a base station and a controller 1710 for configuring an MBS radio bearer for receiving the MBS session data based on the configuration information. The receiver 1730 may receive a MAC protocol data unit (PDU) in which two or more different logical channels associated with the same group-radio network temporary identifier (G-RNTI) are multiplexed.

According to an embodiment, the configuration information for receiving MBS session data may be included in an RRC reconfiguration message and received by the UE 1700. According to another embodiment, the configuration information for receiving MBS session data may be received through an MBS control channel (MCCH) message.

The configuration information for receiving MBS session data may include various pieces of information necessary for the UE 1700 to receive the MBS session data. For example, the configuration information for receiving MBS session data may include MBS radio bearer identifier information. The MBS radio bearer identifier information may include identification information for identifying the radio bearer used for the UE to receive MBS session data. Further, the logical channel identifier associated with the MBS radio bearer may include identification information indicating one or more logical channels associated to the radio bearer used for the UE to receive MBS session data. The configuration information for receiving MBS session data may include both the MBS radio bearer identifier and the logical channel identifier associated with the MBS radio bearer.

According to an embodiment, the MBS radio bearer identifier may be configured in association with at least one of the MBS session identification information and the MBS QoS flow identification information. In other words, the MBS radio bearer identifier may be allocated in association with the MBS session identification information for identifying the MBS session According to another embodiment, the MBS radio bearer identifier may be allocated in association with QoS flow identification information indicating the MBS QoS flow. According to still another embodiment, the MBS radio bearer identifier may be configured in association with both the MBS session identification information and MBS QoS flow identification information.

According to an embodiment, the logical channel identifier associated with the MBS radio bearer may be allocated as a value distinct from the logical channel identifier allocated to the unicast radio bearer for the DL-SCH. For example, when logical channel identifiers 1-32 are allocated to unicast radio bearers for DL-SCH, logical channel identifiers associated with MBS radio bearers may be allocated values other than 1-32.

According to another embodiment, the logical channel identifier associated with the MBS radio bearer may be allocated using an extended logical channel ID (LCID). For example, the logical channel identifier associated with the MBS radio bearer may be allocated using a 1-octet or 2-octet extended LCID (eLCID) value on the DL-SCH.

Thus, the logical channel identifier associated with the MBS radio bearer may be distinguished from the unicast radio bearer.

The controller 1710 configures an MBS radio bearer for receiving MBS session data in the UE by using the MBS radio bearer identifier and the logical channel identifier associated with the MBS radio bearer. As described above, the logical channel identifier associated with the MBS radio bearer may be allocated a value distinct from the logical channel identifier for the unicast radio bearer. Alternatively, the logical channel identifier associated with the MBS radio bearer may be allocated as an extended LCID codepoint/index.

Further, the controller 1710 controls the overall operation of the UE 1700 according to an embodiment of effectively, separately processing multicast/broadcast service data in an NR radio network necessary to perform the above-described embodiments.

The transmitter 1720 and the receiver 1730 are used to transmit or receive signals or messages or data necessary for performing the above-described embodiments, with the base station.

FIG. 18 is a block diagram illustrating a base station according to an embodiment.

Referring to FIG. 18, a base station 1800 transmitting multicast/broadcast service (MBS) data includes a transmitter 1820 for transmitting configuration information to the UE for enabling a UE to receive MBS session data and a controller 1810 for configuring an MBS radio bearer for transmitting the MBS session data based on the configuration information.

The transmitter 1820 may transmit a MAC protocol data unit (PDU) in which two or more different logical channels associated with the same group-radio network temporary identifier (G-RNTI) are multiplexed.

According to an embodiment, the configuration information for receiving MBS session data may be included in an RRC reconfiguration message and transmitted to the UE. According to another embodiment, the configuration information for receiving MBS session data may be transmitted through an MBS control channel (MCCH) message.

The configuration information for receiving MBS session data may include various pieces of information necessary for the UE to receive the MBS session data. For example, the configuration information for receiving MBS session data may include MBS radio bearer identifier information. The MBS radio bearer identifier information may include identification information for identifying the radio bearer used for the UE to receive MBS session data. Further, the logical channel identifier associated with the MBS radio bearer may include identification information indicating one or more logical channels associated to the radio bearer used for the UE to receive MBS session data. The configuration information for receiving MBS session data may include both the MBS radio bearer identifier and the logical channel identifier associated with the MBS radio bearer.

According to an embodiment, the MBS radio bearer identifier may be configured in association with at least one of the MBS session identification information and the MBS QoS flow identification information. In other words, the MBS radio bearer identifier may be allocated in association with the MBS session identification information for identifying the MBS session. According to another embodiment, the MBS radio bearer identifier may be allocated in association with QoS flow identification information indicating the MBS QoS flow. According to still another embodiment, the MBS radio bearer identifier may be configured in association with both the MBS session identification information and MBS QoS flow identification information.

According to an embodiment, the logical channel identifier associated with the MBS radio bearer may be allocated as a value distinct from the logical channel identifier allocated to the unicast radio bearer for the DL-SCH. For example, when logical channel identifiers 1-32 are allocated to unicast radio bearers for DL-SCH, logical channel identifiers associated with MBS radio bearers may be allocated values other than 1-32.

According to another embodiment, the logical channel identifier associated with the MBS radio bearer may be allocated using an extended logical channel ID (LCID). For example, the logical channel identifier associated with the MBS radio bearer may be allocated using a 1-octet or 2-octet extended LCID (eLCID) value on the DL-SCH.

The controller 1810 may configure an MBS radio bearer for transmitting MBS session data to the UE. In configuring the MBS radio bearer, the controller 1810 may use information included in the configuration information transmitted to the UE. Thus, the base station and the UE may configure an MBS radio bearer. The controller 1810 may control to first configure an MBS radio bearer, generate configuration information, and transmit it to the UE.

The base station may transmit an MAC PDU in which a plurality of logical channels configured in association with one G-RNTI are multiplexed to the UE, transmitting the MBS session data.

Further, the controller 1810 controls the overall operation of the base station 1800 according to an embodiment of effectively, separately processing multicast/broadcast service data in an NR radio network necessary to perform the above-described embodiments.

The transmitter 1820 and the receiver 1830 are used to transmit or receive signals or messages or data necessary for performing the above-described embodiments, with the UE.

The above-described embodiments may be supported by the standard documents disclosed in IEEE 802, 3GPP, and 3GPP2 which are radio access systems. In other words, steps, components, and parts not described to clarify the technical spirit in the embodiments may be supported by the above-described standard documents. Further, all the terms disclosed in the disclosure may be described by the standard documents disclosed above.

The present embodiments described above may be implemented through various means. For example, the present embodiments may be implemented by various means, e.g., hardware, firmware, software, or a combination thereof.

When implemented in hardware, the method according to the present embodiments may be implemented by, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, the method according to the present embodiments may be implemented in the form of a device, procedure, or function performing the above-described functions or operations. The software code may be stored in a memory unit and driven by a processor. The memory unit may be positioned inside or outside the processor to exchange data with the processor by various known means.

The above-described terms, such as "system," "processor," "controller," "component," "module," "interface," "model," or "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may reside within a process and/or thread of execution, and the components may be positioned in one device (e.g., a system, a computing device, etc.) or distributed in two or more devices.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

The invention claimed is:

1. A method for receiving multicast/broadcast service (MBS) data by a user equipment (UE), the method comprising:

receiving configuration information for receiving MBS session data from a base station;

configuring an MBS radio bearer for receiving the MBS session data based on the configuration information; and receiving the MBS session data using a logical channel identifier associated with the MBS radio bearer, wherein the configuration information for receiving the MBS session data includes an MBS radio bearer identifier and the logical channel identifier associated with the MBS radio bearer, wherein the MBS radio bearer identifier is configured in association with MBS session identification information, wherein a logical channel for processing the MBS session data is separately identified based on a group-radio network identifier (G-RNTI) indicated through an MBS control channel (MCCH) and the logical channel identifier associated with the MBS radio bearer, and wherein the logical channel identifier associated with the MBS radio bearer is allocated using a 2-octet extended logical channel ID (LCID).

2. The method of claim 1, wherein the configuration information for receiving the MBS session data is received through a radio resource control (RRC) reconfiguration message or an MBS control channel (MCCH) message.

3. The method of claim 1, wherein the MBS radio bearer identifier is configured in association with MBS QoS flow identification information.

4. The method of claim 1, wherein two or more MBS session data are received using same group-radio network temporary identifier (G-RNTI) or different G-RNTIs.

5. A method for transmitting multicast/broadcast service (MBS) data by a base station, the method comprising:

transmitting configuration information to a user equipment (UE) for enabling the UE to receive MBS session data;

configuring an MBS radio bearer for transmitting the MBS session data based on the configuration information; and transmitting the MBS session data using a logical channel identifier associated with the MBS radio bearer, wherein the configuration information for receiving the MBS session data includes an MBS radio bearer identifier and the logical channel identifier associated with the MBS radio bearer, wherein the MBS radio bearer identifier is configured in association with MBS session identification information, wherein a logical channel for processing the MBS session data is separately identified based on a group-radio network identifier (G-RNTI) indicated through an MBS control channel (MCCH) and the logical channel identifier associated with the MBS radio bearer, and wherein the logical channel identifier associated with the MBS radio bearer is allocated using a 2-octet extended logical channel ID (LCID).

6. The method of claim 5, wherein the configuration information for receiving the MBS session data is transmitted through a radio resource control (RRC) reconfiguration message or an MBS control channel (MCCH) message.

7. The method of claim 5, wherein the MBS radio bearer identifier is configured in association with MBS QoS flow identification information.

8. A user equipment (UE) for receiving multicast/broadcast service (MBS) data, the UE comprising:

a receiver configured to receive configuration information for receiving MBS session data from a base station; and a controller configured to configure an MBS radio bearer for receiving the MBS session data based on the configuration information, wherein the receiver receives the MBS session data using a logical channel identifier associated with the MBS radio bearer, wherein the configuration information for receiving the MBS session data includes an MBS radio bearer identifier and the logical channel identifier associated with the MBS radio bearer, wherein the MBS radio bearer identifier is configured in association with MBS session identification information, wherein a logical channel for processing the MBS session data is separately identified based on a group-radio network identifier (G-RNTI) indicated through an MBS control channel (MCCH) and the logical channel identifier associated with the MBS radio bearer, and wherein the logical channel identifier associated with the MBS radio bearer is allocated using a 2-octet extended logical channel ID (LCID).

9. The UE of claim 8, wherein the configuration information for receiving the MBS session data is received through a radio resource control (RRC) reconfiguration message or an MBS control channel (MCCH) message.

10. The UE of claim 8, wherein the MBS radio bearer identifier is configured in association with MBS QoS flow identification information.

11. The UE of claim 8, wherein two or more MBS session data are received using same group-radio network temporary identifier (G-RNTI) or different G-RNTIs.

12. A base station for transmitting multicast/broadcast service (MBS) data, the base station comprising:

a transmitter configured to transmit configuration information to a user equipment (UE) for enabling the UE to receive MBS session data; and a controller configured to configure an MBS radio bearer for transmitting the MBS session data based on the configuration information, wherein the transmitter transmits the MBS session data using a logical channel identifier associated with the MBS radio bearer, wherein the configuration information for receiving the MBS session data includes an MBS radio bearer identifier and the logical channel identifier associated with the MBS radio bearer, wherein the MBS radio bearer identifier is configured in association with MBS session identification information, wherein a logical channel for processing the MBS session data is separately identified based on a group-radio network identifier (G-RNTI) indicated through an MBS control channel (MCCH) and the logical channel identifier associated with the MBS radio bearer, and wherein the logical channel identifier associated with the MBS radio bearer is allocated using a 2-octet extended logical channel ID (LCID).

13. The base station of claim 12, wherein the configuration information for receiving the MBS session data is transmitted through a radio resource control (RRC) reconfiguration message or an MBS control channel (MCCH) message.

14. The base station of claim 12, wherein the MBS radio bearer identifier is configured in association with MBS QoS flow identification information.

* * * * *